United States Patent
Nelson et al.

(10) Patent No.: US 11,512,234 B2
(45) Date of Patent: Nov. 29, 2022

(54) FARNESENE-BASED TACKIFYING RESINS AND ADHESIVE COMPOSITIONS CONTAINING THE SAME

(71) Applicant: FINA TECHNOLOGY, INC., Houston, TX (US)

(72) Inventors: Keith A. Nelson, Exton, PA (US); Violeta N. Keefe, Exton, PA (US); Nestor Hansen, Coatesville, PA (US)

(73) Assignee: FINA TECHNOLOGY, INC., Houston, TX (US)

( * ) Notice: Subject to any disclaimer, the term of this patent is extended or adjusted under 35 U.S.C. 154(b) by 191 days.

(21) Appl. No.: 16/739,924

(22) Filed: Jan. 10, 2020

(65) Prior Publication Data

US 2021/0214592 A1    Jul. 15, 2021

(51) Int. Cl.
*C09J 147/00* (2006.01)
*C08F 36/22* (2006.01)
(Continued)

(52) U.S. Cl.
CPC ............ *C09J 147/00* (2013.01); *C08F 36/22* (2013.01); *C08F 236/22* (2013.01); *C08F 136/22* (2013.01)

(58) Field of Classification Search
CPC ....... C09J 147/00; C08F 36/22; C08F 136/22; C08F 236/22
See application file for complete search history.

(56) References Cited

U.S. PATENT DOCUMENTS

| | | |
|---|---|---|
| 2,754,288 A | 7/1956 | Banes et al. |
| 3,784,530 A | 1/1974 | Osborn et al. |

(Continued)

FOREIGN PATENT DOCUMENTS

| | | |
|---|---|---|
| EP | 0318217 A2 | 5/1989 |
| EP | 0455105 A2 | 11/1991 |

(Continued)

OTHER PUBLICATIONS

Informal Translation of the Preliminary Office Action with Search Report for Brazilian Application No. BR112018001422-2, dated Feb. 20, 2020, 5 pages.

(Continued)

*Primary Examiner* — Ling Siu Choi
*Assistant Examiner* — David L Miller
(74) *Attorney, Agent, or Firm* — Albert Shung

(57) ABSTRACT

An adhesive composition made from an elastomer and a tackifying resin. The tackifying resin includes a farnesene polymer or copolymer having the following properties: i) less than 10 weight percent of volatile organic compounds; ii) Mn between 300 Da and 1000 Da; iii) Mw between 400 Da and 3000 Da; iv) Mw/Mn between 1.00 and 3.00; v) Tg between −50° C. and 20° C.; and vi) viscosity between 400,000 cP and 1,000,000 cP at 25° C. A method of making the farnesene-based polymer or copolymer includes combining a farnesene monomer and a solvent and optionally adding one or more co-monomers selected from dienes, branched mono-olefins, and vinyl aromatics, to provide a monomer feed, and polymerizing the monomer feed by combining it with a Friedel-Crafts initiator in a vessel. The farnesene-based polymer or copolymer tackifier may be combined with one or more elastomers and one or more other tackifiers to form an adhesive composition.

24 Claims, 14 Drawing Sheets

(51) Int. Cl.
*C08F 236/22* (2006.01)
*C08F 136/22* (2006.01)

(56) References Cited

U.S. PATENT DOCUMENTS

| | | | |
|---|---|---|---|
| 3,846,352 | A | 11/1974 | Bullard et al. |
| 3,963,653 | A | 6/1976 | Katayama et al. |
| 3,987,123 | A | 10/1976 | Lepert |
| 4,011,178 | A | 3/1977 | Muse |
| 4,130,701 | A | 12/1978 | Lepert |
| 4,328,090 | A | 5/1982 | Stuckey et al. |
| 4,403,080 | A | 9/1983 | Hughes |
| 4,514,554 | A | 4/1985 | Hughes et al. |
| 4,833,193 | A | 5/1989 | Sieverding |
| 5,284,891 | A | 2/1994 | Wouters et al. |
| 5,814,685 | A | 9/1998 | Satake et al. |
| 6,552,118 | B2 | 4/2003 | Fujita et al. |
| 6,558,790 | B1 | 5/2003 | Holguin et al. |
| 6,900,274 | B2 | 5/2005 | Ruckel |
| 7,070,051 | B2 | 7/2006 | Kanner et al. |
| 7,618,705 | B2 | 11/2009 | Tabata et al. |
| 7,655,739 | B1 | 2/2010 | McPhee et al. |
| 9,334,394 | B1 | 5/2016 | Henning et al. |
| 2012/0165474 | A1 | 6/2012 | McPhee et al. |
| 2015/0025193 | A1 | 1/2015 | Doolan et al. |
| 2017/0029668 | A1 | 2/2017 | Nelson et al. |
| 2017/0327681 | A1* | 11/2017 | Kanbara ............... C08L 47/00 |

FOREIGN PATENT DOCUMENTS

| | | |
|---|---|---|
| EP | 1597333 A2 | 11/2005 |
| EP | 2172529 A1 | 4/2010 |
| JP | 5780402 A | 5/1982 |
| JP | S63215787 A | 9/1988 |
| JP | 2010215880 A | 9/2010 |
| JP | 2012502135 A | 1/2012 |
| JP | 2012502136 A | 1/2012 |
| JP | 2018516302 A | 6/2018 |
| WO | 2010027463 A1 | 3/2010 |
| WO | 2010027464 A1 | 3/2010 |
| WO | 2013126129 A1 | 8/2013 |

OTHER PUBLICATIONS

International Preliminary Report on Patentability and Written Opinion for International Application No. PCT/US2016/043315, dated Feb. 6, 2018, 12 pages.
International Search Report and Written Opinion for International Application PCT/US2016/043315, dated Jan. 2, 2017, 19 pages.
Invitation to Pay Additional Fees and, Where Applicable, Protest Fee, and Communication relating to the results of the partial International Search for International Application No. PCT/US2016/043315, dated Oct. 24, 2016, 13 pages.
Stork et al., "The Stereochemistry of Polyene Cyclization", Journal of American Chemical Society, 1955, vol. 77, pp. 5068-5077.
Notice of Reasons for Rejection for Japanese Application No. 2018-504833, dated Aug. 18, 2020, with translation, 17 pages.
International Search Report and Written Opinion for International Application No. PCT/US2021/012632, dated Apr. 19, 2021, 12 pages.
European Communication pursuant to Article 94(3) for European Application No. 16 745 955.1, dated Dec. 17, 2021, 5 pages.
Korean Office Action for Korean Application No. 10-2018-7005879, dated Jun. 29, 2022 with translation, 12 pages.
International Preliminary Report on Patentability for International Application No. PCT/US2021/102632, dated Jul. 12, 2022, 7 pages.

* cited by examiner

US 11,512,234 B2

FARNESENE-BASED TACKIFYING RESINS AND ADHESIVE COMPOSITIONS CONTAINING THE SAME

FIELD OF THE INVENTION

The invention relates to adhesive compositions comprising a tackifying resin. The tackifying resin comprises a low molecular weight farnesene-based homopolymer or copolymer comprising, as polymerized monomers, β-farnesene. The farnesene-based polymer may be prepared using a Friedel-Crafts initiator and has a glass transition temperature between −50° C. and 20° C. and a viscosity between 400,000 cP and 1,000,000 cP at 25° C.

BACKGROUND

Hot melt adhesives typically exist as entirely solid materials which do not contain or require any solvents for use. They are solid materials at ambient room temperature, but can be converted to a liquid or fluid state by the application of heat, in which state they may be applied to a substrate. After heating, on cooling, the hot melt adhesive regains its solid form and gains its cohesive strength. In this regard, hot melt adhesives differ from other types of adhesives, such as water-based adhesives, which achieve a solid state by evaporation, removal of solvents, polymerization, or other means. Hot melt adhesives may be formulated to be relatively hard and free of tack or, in contrast, to be pressure sensitive, i.e., relatively soft and tacky at room temperature.

Adhesives of the latter type (i.e., pressure sensitive adhesives), whether hot melt or not, which are soft and tacky, i.e. sticky, at room temperature are particularly useful in the manufacture of a variety of industrial or consumer goods where bonding of various substrates is important, such as labels for packages, tapes of all types, end-of-line case and carton assembly and closure adhesives, non-woven adhesives, wood adhesives, book-binding adhesives, etc. Other applications utilizing hydrocarbon resin include wax modification and traffic striping. An advantage of hot melt adhesives is the absence of a liquid carrier, as would be the case for water-based or solvent-based adhesives, which require a drying step during application of the adhesive. Suitable hot melt adhesives possess the appropriate bond strength to adhere the substrates involved, and also demonstrate adequate flexibility, no staining or bleed-through of the substrate, suitable viscosity and open time to function on a variety of substrates, acceptable stability under storage conditions, and acceptable thermal stability under normal application temperature, and most importantly, are sticky (tacky) at the application temperature.

The application temperature, i.e., the temperature at which the adhesive-coated article (for example: tape or label) is applied to the substrate, may vary depending on the intended use of the adhesive. In order to have acceptable tackiness, the Tg of the adhesive should be approximately 15° C. lower than the temperature at which the adhesive is applied. For example, if the adhesive is intended to attach a label to a frozen food product at about −10° C., then the Tg of the adhesive should be about −25° C. to have acceptable tackiness. A label adhesive used at ambient temperature would thus need to have a Tg of about 10° C. Hot melt and other adhesive compositions, such as pressure sensitive adhesives (PSAs), typically employ tackifying resins to modify the Tg of the adhesive as needed for the desired use. As is known in the art, the Tg of a mixture of polymers is related to the Tg of each of the polymers in the mixture.

Tackifying resins are typically used to modify the Tg of the elastomer which is the base of these adhesives. The elastomer usually has a Tg of around −60° C. (if polyisoprene based) or −80° C. (if styrene-butadiene block copolymer based). However, it should be noted that these are not the only elastomers that can be used as adhesives. Liquid tackifying resins having a relatively low glass transition temperature (but higher than the Tg of the elastomer to which they are added) are attractive for use as tackifying resins to be added to the elastomers, since they are compatible with the elastomer and help impart the desired tackiness at sub-ambient conditions. As noted above, in the case of pressure sensitive adhesives, the glass transition temperature (Tg) of the formulated pressure sensitive adhesive must be below the temperature at which the adhesive is applied, for optimum tack. Typically (but not exclusively) tape and label adhesives accomplish the combination of low cost, high performance and desired Tg using a blend of one or more tackifiers where one tackifier has a lower Tg than the other tackifier. The Tgs of both tackifiers are higher than that of the elastomer. The lower Tg tackifier is generally a liquid at ambient temperature, which is desirable. However, when these lower Tg tackifiers are made with low molecular weight monomers, they also have undesirable environmental and health drawbacks, because of their high volatile organic compounds (VOC) content. Furthermore, these monomers are produced from petroleum, a non-renewable resource, which currently may be viewed as an additional environmental drawback. The C5 diolefins such as 1,3-pentadiene and isomers thereof, collectively commonly referred to as piperylene, are currently a basic feed stock for the production of such tackifying resins. Other olefins and diolefins such as 2-methyl-1-butene, 2-methyl-2-butene, and dicyclopentadiene are also used as feedstocks for tackifying resins.

There is therefore a need for alternative monomers for the augmentation or even complete replacement of current petroleum-based diolefins for the production of liquid (at ambient temperatures) tackifying resins for use as the lower Tg tackifier, having a suitable, relatively low Tg and which are cost-effective and readily available. The alternative monomers may produce a tackifier having sufficiently low Tg, low VOC content, low odor and low initial color, and which is liquid at ambient temperatures, and is compatible with the elastomers and other tackifiers commonly used in the formulation of hot melt and pressure sensitive adhesive compositions, among other desirable properties.

SUMMARY OF THE INVENTION

Farnesene-based tackifying resins, particularly β-farnesene-based resins, have been found to provide all of the desired advantages for such relatively low Tg tackifying resins, in that they combine a low glass transition temperature with the attendant comparable adhesion property to conventional tackifying resins, with a lower VOC content and an improved environmental footprint, since β-farnesene may be renewably sourced. They also are liquid at ambient conditions (e.g., 15° C. to 25° C.).

One aspect of the present invention is an adhesive composition comprising an elastomer and a tackifying resin. The tackifying resin comprises a farnesene polymer comprising one or more polymerized monomers. The polymerized monomers comprise farnesene. The farnesene may be or may comprise β-farnesene. The farnesene polymer has less than 10 weight percent of volatile organic compounds (VOC) as measured by thermogravimetric analysis (TGA) as percent weight loss during 1 hour at 110° C. Additionally, the farnesene polymer has the following properties: Mn between 300 Da and 1000 Da; Mw between 400 Da and 3000 Da; Mw/Mn between 1.00 and 3.00; Tg) between −50° C. and 20° C.; and viscosity between 400,000 cP and 1,000,000 cP at 25° C. The farnesene polymer itself is a further aspect of the present invention.

Another aspect of the present invention is a method of preparing the farnesene polymer used as or in a tackifying resin. The preparation method comprises the following steps. First, a farnesene monomer, an organic solvent, between 300 ppm weight and 3000 ppm weight of a proton source, and an optional at least one co-monomer are combined to form a monomer feed. The farnesene monomer may be or may comprise β-farnesene. Then the monomer feed is combined with a Friedel-Crafts polymerization initiator in a vessel to form a polymerization mixture. The polymerization mixture is allowed to react, polymerizing the farnesene monomer and the optional at least one co-monomer to form the farnesene polymer.

Another aspect of the present invention is a method of preparing the adhesive composition comprising the elastomer and the farnesene polymer tackifying resin. The preparation method comprises the following steps. First, a farnesene monomer, an organic solvent, between 300 ppm weight and 3000 ppm weight of a proton source, and an optional one co-monomer are combined to form a monomer feed. The farnesene monomer may be or may comprise β-farnesene. Then the monomer feed is combined with a Friedel-Crafts polymerization initiator in a vessel to form a polymerization mixture. The polymerization mixture is allowed to react, polymerizing the β-farnesene monomer and the optional at least one co-monomer to form the farnesene polymer which is suitable for use as a tackifying resin. The farnesene polymer which is suitable for use as a tackifying resin is combined with the elastomer and optionally, one or more further additives to form the adhesive composition. The farnesene polymer which is suitable for use as a tackifying resin is used in an amount effective to impart tackiness to the adhesive composition.

DETAILED DESCRIPTION OF THE INVENTION

Figure 1:
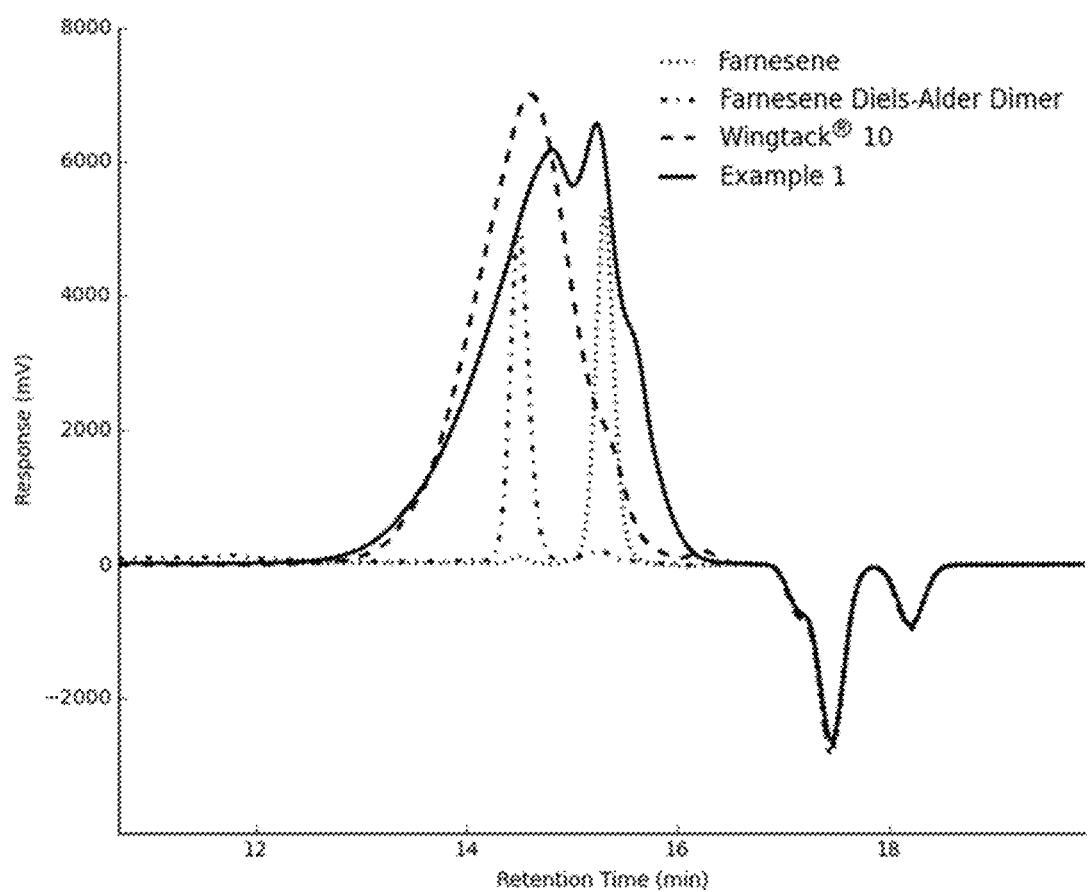
FIG. 1 shows a size exclusion chromatogram of an exemplary embodiment of the farnesene-based tackifying resin compared to farnesene monomer, farnesene Diels-Alder dimer and a comparative tackifying resin made without a farnesene monomer.

Farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). As used in the specification and in the claims, "β-farnesene" means (E)-β-farnesene having the following structure:

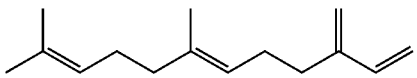

As used in the specification and claims, "farnesene" means any isomer of farnesene or a mixture of such isomers. Additionally, it should be understood that "farnesene" or "β-farnesene" also means farnesene or (E)-β-farnesene in which one or more hydrogen atoms have been replaced by another atom or group of atoms, i.e. substituted farnesene.

The farnesene monomer used to produce various embodiments of the resin (also referred to herein as "farnesene polymer") according to the present invention may be prepared by chemical synthesis from petroleum resources, extracted from insects, such as Aphididae, or plants. Therefore, an advantage of the present invention is that the resin may be derived from a monomer obtained via a renewable resource. It resin may be prepared by culturing a microorganism using a carbon source derived from a saccharide. The farnesene resin, also referred to herein as "farnesene polymer" according to the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and it may be a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

As used throughout the specification and the claims, ranges recited as "between x and y" or "from x to y" should be understood as inclusive of the limits "x" and "y" of such ranges.

As used throughout the specification and the claims, "Friedel-Crafts catalyst" or "Friedel-Crafts initiator" means a strong Lewis acid and the complexes thereof that function as a polymerization initiator.

As used throughout the specification and the claims, the terms "farnesene polymer", "farnesene resin", "farnesene-based tackifying resin," "farnesene-based polymer", "farnesene polymer tackifying resin", and "farnesene tackifying resin" are interchangeable.

As used throughout the specification and the claims, "polymer" means a compound which is the product of the polymerization of monomers as a result of the Friedel-Crafts initiator, wherein the polymers have a degree of polymerization of 2 or greater. It is important to distinguish between polymers made using Friedel-Crafts initiators, wherein the polymer has a degree of polymerization of 2 and dimers of the monomer which are a result of Diels-Alder cyclization. The structure of these two materials are different, even though they both are formed from two molecules of a monomer such as farnesene. Diels-Alder dimers may also be formed from two different monomers, e.g. farnesene and a substituted olefin. All of these dimers will comprise a 6-membered ring.

A non-limiting example of a Diels-Alder dimer of two molecules of farnesene is shown below:

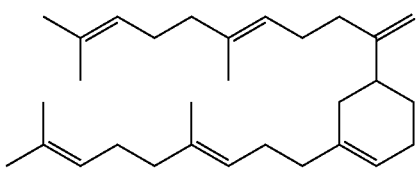 [SMILES: C=C(CC/C=C(\C)CCC=C(C)C)C1CCC=C(CC/C=C(\C)CCC=C(C)C)C1]

Other examples of Diels-Alder dimers of farnesene are shown in U.S. Pat. No. 8,669,403 B2, the entire contents of which is incorporated by reference herein for all purposes. In certain embodiments of the present invention, the farnesene-based tackifying resin, i.e. farnesene polymer may not contain any of such dimers (i.e., the farnesene-based tackifying resin may comprise 0 weight percent of such Diels-Alder dimers of farnesene.) If dimer is present in the farnesene-based tackifying resin, the farnesene-based tackifying resin may comprise up to 5 weight percent of such Diels-Alder dimers of either just farnesene or farnesene and another monomer. For example, the farnesene-based tackifying resin may comprise 0 wt. %, or 0.1 wt. %, or 0.2 wt. %, or 0.3 wt. %, or 0.4 wt. %, or 0.5 wt. %, or 0.6 wt. %, or 0.7 wt. %, or 0.8 wt. %, or 0.9 wt. %, or 1.0 wt. %, or 1.1 wt. %, or 1.2 wt. %, or 1.3 wt. %, or 1.4 wt. %, or 1.5 wt. %, or 1.6 wt. %, or 1.7 wt. %, or 1.8 wt. %, or 1.9 wt. %, or 2.0 wt. %, 2.1 wt. %, or 2.2 wt. %, or 2.3 wt. %, or 2.4 wt. %, or 2.5 wt. %, or 2.6 wt. %, or 2.7 wt. %, or 2.8 wt. %, or 2.9 wt. %, or 3.0 wt. %, or 3.1 wt. %, or 3.2 wt. %, or 3.3 wt. %, or 3.4 wt. %, or 3.5 wt. %, or 3.6 wt. %, or 3.7 wt. %, or 3.8 wt. %, or 3.9 wt. %, or 4.0 wt. %, or 4.1 wt. %, or 4.2 wt. %, or 4.3 wt. %, or 4.4 wt. % or 4.5 wt. %, or 4.6 wt. %, or 4.7 wt. %, or 4.8 wt. %, or 4.9 wt. %, or 5.0 wt. % of Diels-Alder dimers. The amount of the Diels-Alder dimer present may be conveniently measured by HNMR or in some instances by gel permeation chromatography (GPC) or by gas chromatography (GC).

In contrast, a non-limiting example of one possible farnesene polymer having a degree of polymerization of 2 produced from two molecules of farnesene with a Friedel-Crafts initiator could have the following structure:

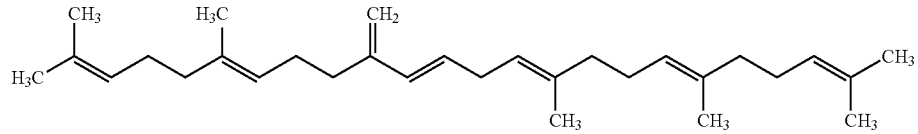 [SMILES: C=C(/C=C/C/C=C(\C)CC/C=C(\C)CCC=C(C)C)CC/C=C(\C)CCC=C(C)C]

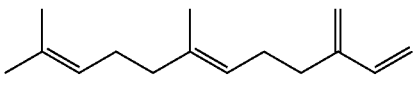

(E)-β-farnesene or farnesene in which one or more hydrogen atoms have been replaced by another atom or group of atoms (i.e. substituted) may also be used in embodiments of this invention. The term "farnesene" as used throughout the specification and claims means any isomer of farnesene or a mixture of such isomers.

The farnesene monomer used to produce various embodiments of the tackifying resin according to the present invention may be prepared by chemical synthesis from petroleum resources, extracted from insects, such as Aphididae, or plants. Therefore, an advantage of the present invention is that the resin may be derived from a monomer obtained via a renewable resource. It may be prepared by culturing a microorganism using a carbon source derived from a saccharide. The farnesene resin according to the present invention may be efficiently prepared from farnesene monomer obtained via these sources.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

The cultured microorganism that consumes the carbon source may be any microorganism capable of producing farnesene through culturing. Examples thereof include eukaryotes, bacteria, and archaebacteria. Examples of eukaryotes include yeast and plants. The microorganism may be a transformant obtained by introducing a foreign gene into a host microorganism. The foreign gene is not particularly limited, and it is may be a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

Resins made according to the present invention differ from previously known farnesene-based polymers in that the methods generally used to provide the previous polymer resins were either anionic or free radical polymerization, both of which lead to materials having lower glass transition temperatures, but such materials tend also to have higher weight average (Mw) and number average (Mn) molecular weights, which are not desirable because these higher molecular weight materials are not liquid at room temperature. In contrast, using cationic polymerization methods tends to produce lower molecular weight (Mn and Mw) farnesene-based polymers which have a higher Tg (albeit still quite low). Thus, an aspect of the invention as described herein is the production of farnesene-based polymers that are liquid at room temperature, possess a low, but not too low, glass transition temperature (Tg), and have a low VOC content.

Figure 21:
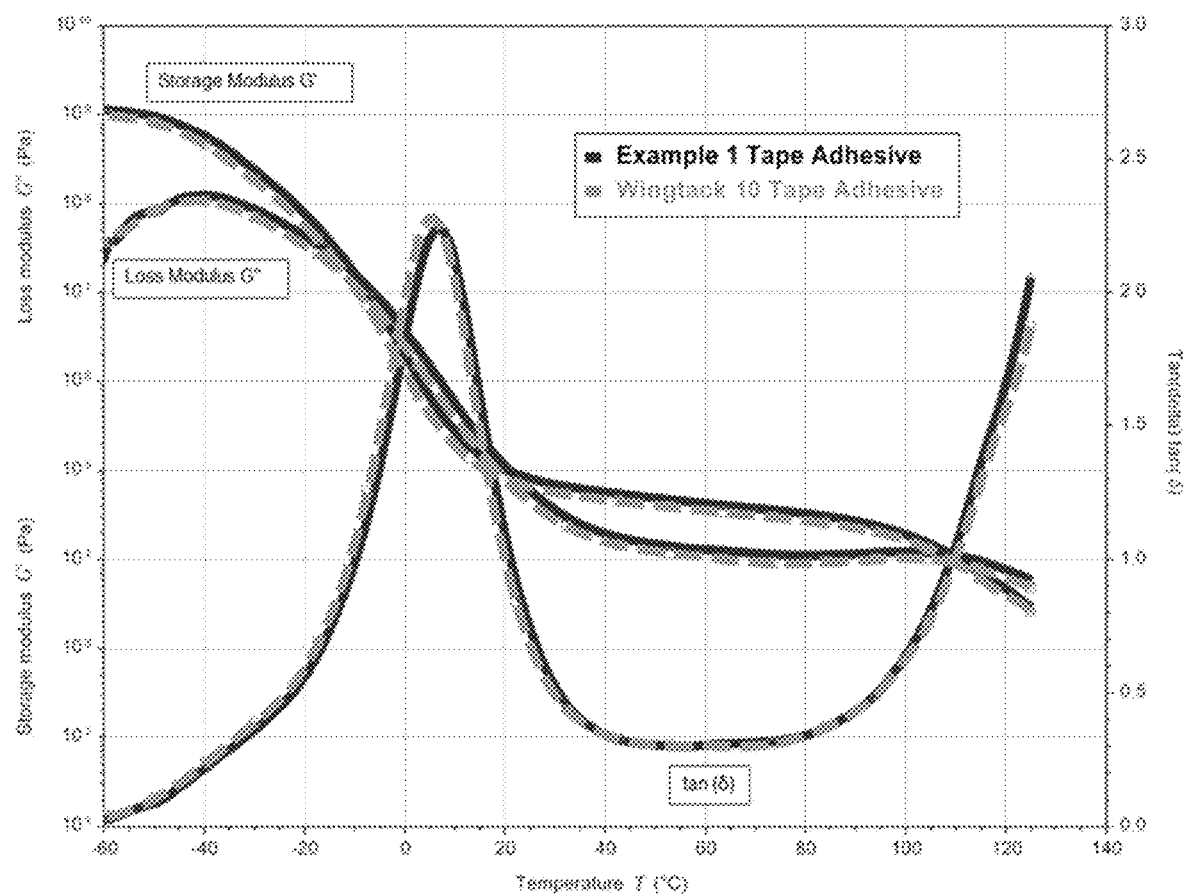
FIG. 21 shows a dynamic mechanical analysis curve of tape adhesive composition made according to an embodiment of the present invention.
Figure 22:
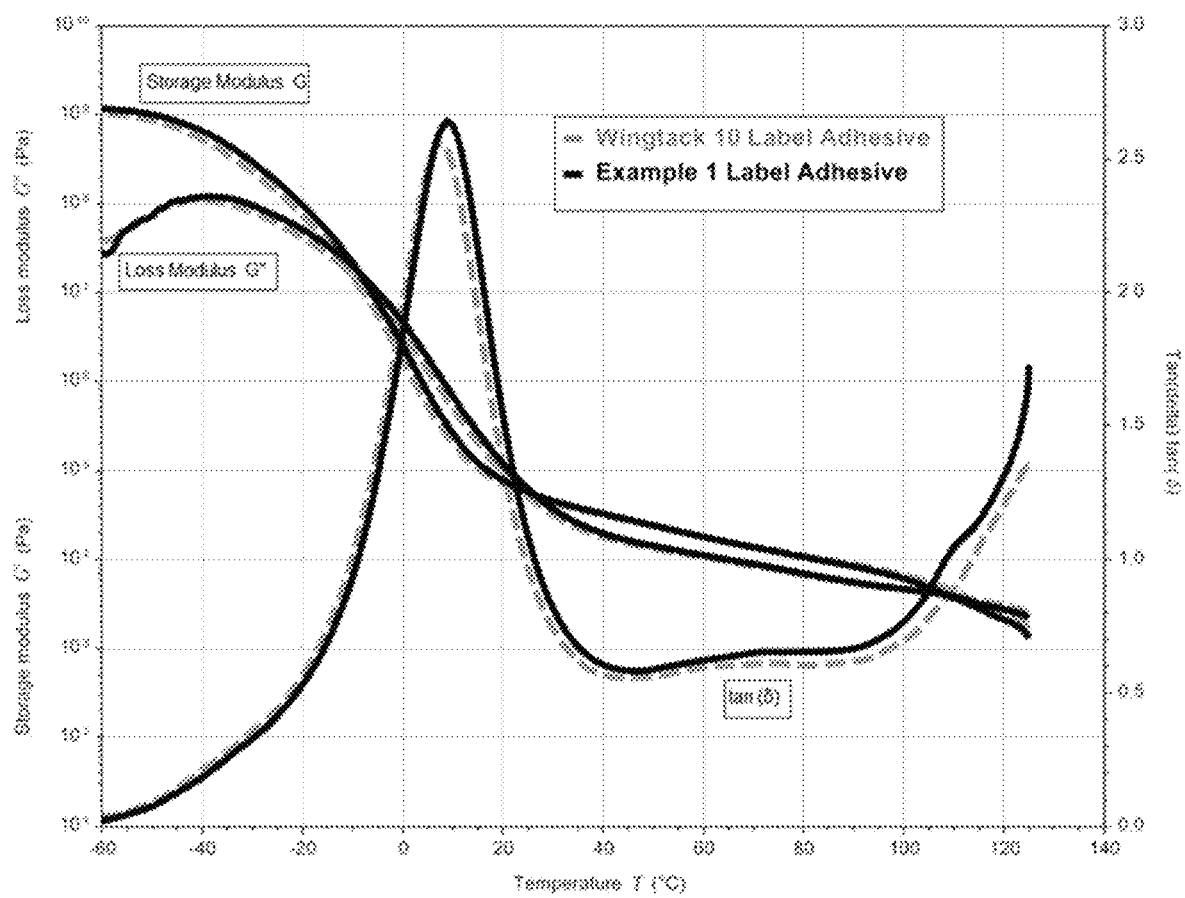
FIG. 22 shows a dynamic mechanical analysis curve of label adhesive composition made according to an embodiment of the present invention.

It is one aspect of the present invention to provide a hot melt or pressure sensitive adhesive composition comprising a liquid tackifying resin derived from a farnesene monomer. The resin has a low molecular weight, i.e., an Mn between 300 and 1000 Da and an Mw may be between 400 and 3000 Da. These farnesene-based homopolymer or copolymer resins are obtained by using a Friedel-Crafts initiator and have a glass transition temperature between −50° C. and 10° C. The farnesene-based tackifying resins made according to various embodiments of the present invention also exhibit low color and good compatibility with the other components of the hot melt adhesive. "Compatibility" as used herein means that when the tackifying resin is present in the adhesive, the tangent delta (tan δ) peak of an adhesive composition, as measured by dynamic mechanical analysis such as a torsional melt rheometer, is monomodal as shown in FIG. 21 and FIG. 22 for an exemplary tape adhesive and an exemplary label adhesive as prepared according to embodiments of the present invention.

The low molecular weight farnesene-based homopolymers or copolymer tackifying resins prepared using a Friedel-Crafts initiator can be homopolymers of farnesene and copolymers of farnesene and at least one C5 or higher diene, at least one C4 or higher branched or cyclic mono-olefin, at least one vinyl aromatic monomer, and combinations thereof. The amount and type of co-monomer(s) selected may impart desired functionality to the resin.

As noted above, farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). As used in the specification and in the claims, "β-farnesene" means (E)-β-farnesene having the following structure:

As previously noted, farnesene polymers suitable for use as tackifying resins according to the present invention may be low molecular weight copolymers having a Tg between −50° C. and 20° C. that may include one or more co-monomers in addition to farnesene. Examples of suitable co-monomers include, but are not limited to, piperylene (1,3-pentadiene and isomers thereof), styrene, alpha-methyl styrene, isoamylene (β-isoamylene or trimethylethylene or 2-methyl-2-butene or 2-methylbut-2-ene), cyclopentene, 2-methylstyrene, 3-methylstyrene, 4-methylstyrene, 4-t-butylstyrene, 4-cyclohexylstyrene, 4-dodecylstyrene, 2,4-di-isopropylstyrene, 2,4,6-trimethylstyrene, 2-ethyl-4-benzylstyrene, 4-(phenyl butyl)styrene, 1-vinylnaphthalene, 2-vinylnaphthalene, vinylanthracene, 4-methoxystyrene, monochlorostyrene, dichlorostyrene, indene, methyl indene, isoprene, terpenes such as myrcene, pinene, and limonene, dipentene, pentene, isobutylene, 2-methyl-1-butene, 2-methyl-1-pentene, 2-methyl-2-pentene, 2,3-dimethyl-1-butene, 2,3-dimethyl-2-butene, 3,3-dimethyl-1-butene, and 3-methyl-2-pentene, and isomers thereof. Piperylene, iso-amylene, styrene, alpha-methyl styrene, 2-methyl-2-butene, 2-methyl-1-butene, cyclopentene, mixtures thereof and isomers thereof may be used.

According to other embodiments of the present invention, mono-olefin-chain transfer agents may also be polymerized with the farnesene monomers used to produce the tackifying resins. The mono-olefins include, but are not limited to, isobutylene, 2-methyl-2-butene, 2-methyl-1-butene, 2-methyl-1-pentene, 2-methyl-2-pentene, 2,3-dimethyl-1-butene, 2,3-dimethyl-2-butene, 3,3-dimethyl-1-butene, 3-methyl-2-pentene, mixtures thereof, dimers thereof, and oligomers thereof. Isobutylene and 2-methyl-2-butene are preferred.

Polymerization Initiators and Co-Initiators:

Farnesene polymers suitable for use as tackifying resins as described herein are prepared via cationic polymerization of olefins and diolefins initiated by strong Lewis acids. Strong Lewis acids are able to catalyze Friedel-Crafts reactions and so are interchangeably referred to as Friedel-Crafts catalysts and Friedel-Crafts initiators. Some Lewis acids have been proposed to initiate polymerization by direct addition to a double bond. However, these are exceptions as most Lewis acids require the presence of a co-initiator. Such co-initiating reagents fall into two categories; protonating and cationating. Protonating reagents provide a proton upon activation by a Lewis acid. Examples include water, alcohols, carboxylic acids, amines, and amides. Cationating reagents are those that generate a carbenium ion upon activation by a Lewis acid. Examples include alkyl halides, allyl halides, benzylic halides, esters, ethers, and carboxylic acid anhydrides. While neither is able to initiate polymerization, it is the combination of these co-initiators, a Lewis acid and a protonating or cationating reagent that generates the true initiating species i.e. a proton or carbenium ion that then adds to a double bond to initiate polymerization.

Friedel-Crafts catalysts or initiators are strong Lewis acid polymerization initiators, as explained above, which polymerize monomers via a cationic reaction mechanism. According to various embodiments of the present invention, examples of Friedel-Crafts catalysts that may be used to polymerize a monomer feed comprising farnesene to produce a farnesene polymer suitable for use as a tackifying resin having a suitably low molecular weight range of Mn of 300-1000 Da and Mw of 400-3000 Da and a glass transition temperature may be between −50° C. and 20° C. include, but are not limited to, boron trifluoride, aluminum trichloride, tin tetrachloride, titanium trichloride, titanium tetrachloride, iron chloride(III), aluminum tri-bromide, dichloromonoethyl aluminum, and complexes thereof, such as boron trifluoride-phenol complex, boron trifluoride-ethanol complex, boron trifluoride-ether complexes and the like, such as boron trifluoride-diethyl ether complex as discussed previously. The Friedel-Crafts catalyst may also include a liquid aluminum chloride/hydrochloric acid/substituted aromatics complex, the aromatic being for example o-xylene, mesitylene, ethyl benzene, isopropyl benzene, and the like, such as short or long chain alkylbenzenes. The alkyl chain may be linear or branched and may vary from 2 to 30 carbon atoms. Acidic liquid $AlCl_3$ obtained as by-products during the alkylation of benzene or any other substituted aromatics (toluene, xylenes) with branched chain olefins may also be used. The branched chain olefins may be produced via the boron trifluoride oligomerization of propylene and fractionation (e.g. C12 olefins or C24 olefins may be alkylated with aromatics).

In various embodiments of the present invention, at least one of $AlCl_3$ and $BF_3$ and/or complexes thereof as discussed above, may be used as Friedel-Crafts initiators to polymerize a monomer feed comprising farnesene monomer and a co-monomer or a mixture of co-monomers in which the co-monomer content (i.e. in addition to the farnesene) of the monomer feed is ≤90, ≤85, ≤80, ≤75, ≤70, ≤65, ≤60, ≤55, ≤50, ≤45, ≤40, ≤35, ≤30, ≤25, ≤20, ≤15, ≤10, ≤5, ≤4.75, ≤4.5, ≤4.25, ≤4.0, ≤3.75, ≤3.5, ≤3.25, ≤3.0, ≤2.75, ≤2.5, ≤2.25, ≤2.0, ≤1.75, ≤1.5, ≤1.25, ≤1.0, ≤0.75, ≤0.5, ≤0.25, ≤0.1, ≤0.05, or ≤0.01 wt. %), based on the total weight of the monomer in the monomer feed.

As mentioned above, the polymerization initiator may be $BF_3$. The initiator may be added as a gas or as a liquid source of $BF_3$. An example of such a liquid source is commonly referred to as "boron trifluoride etherate" or "boron trifluoride diethyl etherate". Analogues of this compound are also suitable, such as the methanol complex, as a non-limiting example, as discussed above.

Typical Friedel-Crafts initiators are $AlCl_3$ or $BF_3$ or sources of $AlCl_3$ or $BF_3$, i.e. the complexes discussed previously. As is known in the art, these initiators are more effective (i.e., the reaction is faster) when a proton source is used as a co-initiator to effect the cationic polymerization. Typically, such co-initiators are water or alcohols. Selection of suitable proton sources may depend on such process factors as desired reactivity or reaction rate, solubility in the polymerization solvent or safety/environmental concerns, for example. Non-limiting examples of suitable proton sources are molecules having the structure R—OH, in which the H is acidic. The R group may be H or a lower alkyl group, such as methyl, ethyl, propyl, isopropyl, butyl, sec-butyl, isobutyl. R may be an aromatic, such as a phenyl group, but for example, phenol may be reactive towards the Friedel-Crafts initiator and so may be incorporated into the polymer. This effect may or may not be desirable. Non-limiting examples of these proton sources, also referred to herein as a co-initiator are water, methanol, n-propanol, or isopropanol, for example. The water may not need to be explicitly added in certain embodiments, in that the moisture present in the atmosphere or other components of the polymerization mixture may participate as a proton source (co-initiator) in the Friedel-Crafts initiated polymerization.

The ratio of moles of Friedel-Crafts initiator to moles of co-initiator—i.e. proton source is approximately 1:1 or within a range of 0.5:1 to approximately 1:0.5. The ratio of moles of Friedel-Crafts initiator to moles of co-initiator can be 0.5:1, 0.55:1, 0.6:1, 0.65:1, 0.7:1, 0.75:1, 0.8:1, 0.85:1, 0.9:1, 0.95:1, 1:1, 1:0.95, 1:0.9, 1:0.85, 1:0.8, 1:0.75, 1:0.7, 1:0.65, 1:0.6, 1:0.55, or 1:0.5.

The farnesene polymers described herein may be prepared by a continuous solution polymerization process wherein the Friedel-Craft initiator, co-initiator, co-monomers, and a suitable aromatic or aliphatic hydrocarbon solvent, such as, for example, toluene, xylene, or heptane, are continuously added to a reactor vessel to form the desired homopolymer or copolymer. Alternatively, the farnesene-based polymers may be prepared by a batch process in which all of the initiator, monomers, and solvent are combined in the reactor together substantially simultaneously. A semi-batch process is also possible as a production method for the tackifying resins disclosed herein. In certain processes, the solvent may also comprise certain organic specifies that may also participate as co-monomers in the polymerization reaction.

During a continuous or semi-batch polymerization reaction, the flow rates of monomer feed and Friedel-Crafts initiator may be controlled, such that the initiator feed is about 0.01 to 20 wt. % based on the combined mass flow rate of the total reactant feed, i.e. the monomers, the initiator and the co-initiator (the proton source, such as an alcohol). Thus, Friedel-Crafts initiator can be added at 0.1 to 5 wt. %, or 0.1 to 3 wt. %, or 0.1 wt. %, or 0.15 wt. %, or 0.20 wt. %, or 0.25 wt. %, or 0.3 wt. %, or 0.35 wt. %, or 0.4 wt. %, or 0.45 wt. %, or 0.50 wt. %, or 0.55 wt. %, or 0.6 wt. %, or 0.65 wt. %, or 0.7 wt. % or 0.75 wt. %, or 0.80 wt. %, or 0.85 wt. %, or 0.9 wt. %, or 0.95 wt. %, or 1.0 wt. %, or 1.1 wt. %, or 1.15 wt. %, or 1.20 wt. %, or 1.25 wt. %, or 1.3 wt. %, or 1.35 wt. %, or 1.4 wt. %, or 1.45 wt. %, or 1.50 wt. %, or 1.55 wt. %, or 1.6 wt. %, or 1.65 wt. %, or 1.7 wt. % or 1.75 wt. %, or 1.80 wt. %, or 1.85 wt. %, or 1.9 wt. %, or 1.95 wt. %, or 2.0 wt. %, 2.1 wt. %, or 2.15 wt. %, or 2.20 wt. %, or 2.25 wt. %, or 2.3 wt. %, or 2.35 wt. %, or 2.4 wt. %, or 2.45 wt. %, or 2.50 wt. %, or 2.55 wt. %, or 2.6 wt. %, or 2.65 wt. %, or 2.7 wt. % or 2.75 wt. %, or 2.80 wt. %, or 2.85 wt. %, or 2.9 wt. %, or 2.95 wt. %, or 3.0 wt. % of the total reactant feed. Likewise, in a batch reactor, the total amount of the Friedel-Crafts initiator is generally determined as a weight percent of the total reactant (monomer(s), initiator, co-initiator) feed, such as 0.1 wt. %, or 0.15 wt. %, or 0.20 wt. %, or 0.25 wt. %, or 0.3 wt. %, or 0.35 wt. %, or 0.4 wt. %, or 0.45 wt. %, or 0.50 wt. %, or 0.55 wt. %, or 0.6 wt. %, or 0.65 wt. %, or 0.7 wt. % or 0.75 wt. %, or 0.80 wt. %, or 0.85 wt. %, or 0.9 wt. %, or 0.95 wt. %, or 1.0 wt. %, or 1.1 wt. %, or 1.15 wt. %, or 1.20 wt. %, or 1.25 wt. %, or 1.3 wt. %, or 1.35 wt. %, or 1.4 wt. %, or 1.45 wt. %, or 1.50 wt. %, or 1.55 wt. %, or 1.6 wt. %, or 1.65 wt. %, or 1.7 wt. % or 1.75 wt. %, or 1.80 wt. %, or 1.85 wt. %, or 1.9 wt. %, or 1.95 wt. %, or 2.0 wt. %, 2.1 wt. %, or 2.15 wt. %, or 2.20 wt. %, or 2.25 wt. %, or 2.3 wt. %, or 2.35 wt. %, or 2.4 wt. %, or 2.45 wt. %, or 2.50 wt. %, or 2.55 wt. %, or 2.6 wt. %, or 2.65 wt. %, or 2.7 wt. % or 2.75 wt. %, or 2.80 wt. %, or 2.85 wt. %, or 2.9 wt. %, or 2.95 wt. %, or 3.0 wt. % of the total reactant feed.

The co-initiator, if used, may likewise be added as a weight percentage of the total reactant feed or feed rate, or as described above, the amount of co-initiator may be added as a ratio to the Friedel-Crafts initiator. As a weight percent of the total reactant feed or feed rate, when the reactants are the monomer(s), the Friedel-Crafts initiator and the co-initiator, the co-initiator, such as an alcohol, may be added from 300 parts per million weight (ppm) to 3000 ppm of the reactant feed or feed rate. For instance, the co-initiator may be added at 300 ppm, 400 ppm, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, or 3000 ppm by weight of the total reactant feed or feed rate.

The reaction temperature of the mixture in the reactor vessel may also be maintained at a temperature of about −10° C. to 80° C. or −10° C. to 50° C., or 0° C. to 10° C., or about 10° C. to 60° C., or 20° C. to 40° C.

The low molecular weight farnesene-based homopolymers or copolymers of the resins according to embodiments of the present invention may have a number average molecular weight (Mn) between 300 and 10,000 g/mol (Da), or between 300 and 3000 Da, or between 300 and 1000 Da, or between 300 and 500 Da measured through a gel permeation chromatograph and converted using polystyrene calibration. The low molecular weight farnesene-based homopolymers or copolymers of the resins according to embodiments of the present invention may have a weight average molecular weight (Mw) between 300 and 10,000 Da, or between 400 and 5000 Da, or between 400 and 3000 Da or between 400 and 800 Da as measured through a gel permeation chromatograph and converted using polystyrene calibration.

The polydispersity (Mw/Mn, also referred to as PD) of the farnesene-based tackifying resin can range from 1.0 to 3.0. The polydispersity of the farnesene-based tackifying resin can be 1.0, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2.0, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, or 3.0.

The volatile organic compounds content (VOC) of the liquid farnesene-based tackifying resins disclosed herein may be between 0 wt. % and 10 wt. % of the resin, after removal of residual solvent and monomer. The VOC content, as described herein, is measured by way of thermogravimetric analysis (TGA) as percent weight loss during 1 hour at 110° C. For example, the VOC content of the farnesene-based tackifying resins can be between 0 wt. % and 10 wt. %. The VOC content of the farnesene-based resins may be 0 wt. %, or 0.5 wt. %, or 1.0 wt. %, or 1.5 wt. %, or 2.0 wt. %, or 2.5 wt. %, or 3.0 wt. %, or 3.5 wt. %, or 4.0 wt. %, or 4.25 wt. %, or 4.5 wt. %, or 4.75 wt. %, or 5.0 wt. %, or 5.25 wt. %, or 5.5 wt. %, or 5.75 wt. %, or 6.0 wt. %, or 6.25 wt. %, or 6.5 wt. %, or 6.75 wt. %, or 7.0 wt. %, or 7.25 wt. %, or 7.5 wt. %, or 7.75 wt. %, or 8.0 wt. %, or 8.5 wt. %, or 9.0 wt. %, or 9.5 wt. %, or 10.0 wt. %, as measured by TGA.

The farnesene-based tackifying resin disclosed herein is an extremely viscous liquid at ambient conditions and can have a viscosity between 400,000-1,000,000 cP at 25° C. Therefore, the viscosity is normally measured at 45° C. or 55° C. using a Brookfield viscometer equipped with a small sample adapter and using spindle 21. The rpm is adjusted to keep the response between 20-80% of full scale reading, alternatively around 50% of the full scale reading. When the viscosity of the farnesene-based tackifying resin is measured at 55° C. using a Brookfield viscometer at 55° C., the viscosity of the farnesene-based tackifying resin can be between 100 cP and 100,000 cP.

It is another aspect of the present invention to provide an adhesive composition, such as a hot melt adhesive for instance, comprising at least one elastomer and at least one liquid farnesene-based tackifying resin as described herein. Some embodiments may also comprise a blend of tackifying resins comprising a combination of the farnesene derived (co)polymer and a second tackifying resin. The second tackifying resin may include, but is not limited to, resins made with C5, C5/C9, C9, pure monomer, rosin esters, and the hydrogenated versions thereof.

According to various embodiments of the adhesive composition of the present invention, the elastomer in the adhesive composition that comprises the farnesene tackifying resin may be selected from natural rubber, isoprene rubber, butadiene rubbers, or block copolymers, such as styrene-isoprene block copolymers. Mixtures of these materials are also envisaged in embodiments of this invention. Other non-limiting examples of suitable elastomers are polyacrylate resins, poly ethylene vinyl acetate (EVA) resins, polystyrene butadiene resins, random styrene-butadiene (SBR) copolymers, styrene-butadiene block copolymers, styrene-isoprene-butadiene-styrene (SIBS), styrene-ethylene-propylene-styrene (SEPS), styrene-ethylene-butylene-styrene (SEBS) block copolymers, amorphous polyolefin (APO) resins, and mixtures thereof. If the adhesive composition is to be utilized as a hot melt adhesive, it will be advantageous to select an elastomer, or combination of elastomers, that are thermoplastic, although thermosets could be utilized.

The adhesive compositions according to various embodiments of the present invention may also include a processing oil. Examples of processing oils include, but are not limited to, paraffinic, aliphatic-naphthenic aromatic resins, polyethylene glycol, petroleum oils, ester plasticizers, vulcanized vegetable oils, pine tar, phenolic resins, petroleum resins, polymeric esters and rosins. A processing oil may be used in an amount ranging from about 0 to about 50 wt. % based on the total weight of adhesive resin in the adhesive composition with a range of from about 5 to 35 wt. % being preferred.

The liquid farnesene polymer tackifying resins according to the present invention may be incorporated into an adhesive composition by any method known to those having skill in the art. For example, one or more tackifying resins (in addition to the one or more liquid farnesene polymer tackifying resins) may be added during the compounding of the adhesive composition. The blend of tackifying resins utilized in an adhesive formulation may comprise in a range from 5 wt. % to 100 wt. % of the liquid farnesene polymer or from 10 wt. % to 80 wt. %, 5 wt. % to 50 wt. %, 10 wt. % to 30 wt. %, 15 wt. % to 25 wt. %, 20 wt. % to 30 wt. %, 10 wt. % to 20 wt. %, or 15 wt. % to 75 wt. % of the farnesene polymer in the blend of tackifying resins. An adhesive formulation may comprise in a range of from 3 wt % to 50 wt % of the liquid farnesene polymer as a tackifying resin. An adhesive formulation may comprise from 5 wt % to 40 wt %, 5 wt % to 20 wt %, or 10 wt % to 25 wt % of the farnesene polymer as a tackifying resin. The amount of liquid farnesene polymer incorporated into an adhesive composition varies depending on the expected use temperature of the adhesive composition. The liquid farnesene polymer may be added to the adhesive composition in an amount effective to provide the desired tackiness at a desired temperature.

An exemplary conventional hot melt adhesive includes a styrene-isoprene-styrene (SIS) block copolymer, a hydrocarbon (C5 or C5/C9) tackifying resin, and/or a rosin ester tackifier, and/or a process oil. A liquid tackifying resin derived from farnesene may be used to replace all or part of the C5 or C5/C9 tackifying resin or rosin ester tackifier of this exemplary formulation. A SIS block copolymer may be employed in the hot melt adhesive as the elastomer, such as those which are sold by Kraton Performance Polymers Inc. of Houston, Tex. under the brand name Kraton™ and also Dexco Polymers LP of Plaquemine, La., under the tradename of Vector™. A C5 hydrocarbon tackifying resin may be utilized, such as those which are sold by Total Petrochemicals and Refining, Inc. of Houston, Tex. under the brand name Wingtack®. A naphthenic process oil may be used in the hot melt adhesive as well, such as those sold under the brand name Nyflex® by Nynas AB of Stockholm, Sweden.

For evaluation of this liquid tackifying resin derived from farnesene, two different hot melt pressure sensitive adhesive types were evaluated. One is a formulation that is typical of a hot melt pressure sensitive adhesive tape which tends to produce improved shear strength. The second formulation is typical of a hot melt pressure sensitive adhesive label which tends to have higher tackiness for quick adhesion of a label to packaging. The formulations are shown below.

| Component | | Tape Formulations | | Label Formulations | |
|---|---|---|---|---|---|
| | | phr* | wt. % | phr* | wt. % |
| Vector™ 4113A (elastomer) | SIS | 100 | 40 | — | — |
| Kraton™ D1113 (elastomer) | SIS | — | — | 100 | 36.9 |
| Wingtack® Extra | tackifier | 125 | 50 | 130 | 48.0 |
| Wingtack® 10 (conventional liquid tackifier) OR Example 3 (farnesene polymer liquid tackifier) (below) | liquid tackifier | 25 | 10 | 41 | 15.1 |

*phr is parts per hundred parts of the elastomer

As is known to one skilled in the art, conventional hot melt adhesives may include a variety of other components including, but not limited to, starches, waxes, plasticizers, anti-oxidants, stabilizers, pigments, dyes, biocides, flame retardants, antistatic agents, or fillers. For example, the hot melt adhesive may include Bennox™ 1010, an antioxidant sold by Mayzo Inc. of Norcross, Ga.

The components of an adhesive composition according to the present invention may be combined by any process known to one skilled in the art. For example, they may be introduced separately from each other and separate from, or in combination with, any of the individual components of the conventional adhesive composition. As a further example, the tackifying resin derived from farnesene may be introduced to a composition comprising a styrene-isoprene-styrene (SIS) block copolymer and optionally, a hydrocarbon (C5-C9) tackifying resin. A process oil, such as mineral oil, may be added last. The adhesive composition may be mixed with a sigma blade mixer, for example, until it is homogeneous. Other methods of mixing include, but are not limited to, single or twin screw, and conventional tanks equipped with mixers like an anchor or turbine.

Various exemplary aspects of the invention may be summarized as follows:

Aspect 1: An adhesive composition comprising an elastomer and a tackifying resin, the tackifying resin comprising a farnesene polymer comprising one or more polymerized monomers, wherein the one or more polymerized monomers comprise farnesene, and wherein the farnesene polymer has the following properties:

i) less than 10 weight percent of volatile organic compounds (VOC), as measured by thermogravimetric analysis (TGA) as percent weight loss during 1 hour at 110° C.;

ii) a number average molecular weight (Mn) between 300 Da and 1000 Da;

iii) a weight average molecular weight (Mw) between 400 Da and 3000 Da;

iv) a Mw/Mn is between 1.00 and 3.00;

v) a glass transition temperature (Tg) between −50° C. and 20° C.; and vi) a viscosity between 400,000 cP and 1,000,000 cP at 25° C.

Aspect 2: The adhesive composition according to Aspect 1, wherein the farnesene is or comprises β-farnesene.

Aspect 3: The adhesive composition according to either of Aspect 1 or Aspect 2, wherein the glass transition temperature of the farnesene polymer is between −50° C. and 0° C.

Aspect 4: The adhesive composition according to any of Aspects 1-3, wherein the Mw of the farnesene polymer is between 400 Da and 800 Da, and the Mn of the farnesene polymer is between 300 Da and 500 Da.

Aspect 5: The adhesive composition according to any of Aspects 1-4, wherein the elastomer is selected from the group consisting of styrene-isoprene block copolymers, polyacrylate resins, poly ethylene vinyl acetate (EVA) resins, polystyrene butadiene resins, random styrene butadiene (SBR) copolymers, styrene-butadiene block copolymers, styrene-isoprene-butadiene-styrene (SIBS) copolymers, styrene-ethylene-propylene-styrene (SEPS) copolymers, styrene-ethylene-butylene-styrene (SEBS) block copolymers, amorphous polyolefin (APO) resins, and mixtures thereof.

Aspect 6: The adhesive composition according to any of Aspects 1-5, wherein the farnesene polymer further comprises, as polymerized monomers, between 0 weight percent and 90 weight percent of at least one co-monomer.

Aspect 7: The adhesive composition according to any of Aspects 1-6, wherein the farnesene polymer further comprises, as polymerized monomers, between 0 weight percent and 40 weight percent of at least one co-monomer.

Aspect 8: The adhesive composition according to either of Aspect 6 or Aspect 7, wherein the co-monomer is selected from the group consisting of aromatic olefins, non-aromatic olefins, aromatic diolefins, non-aromatic diolefins, and mixtures thereof.

Aspect 9. The adhesive composition according to any of Aspects 6-8, wherein the co-monomer is selected from the group consisting of styrene; alpha-methyl styrene; cis-1,3-pentadiene; trans-1,3 pentadiene; 2-methyl-1-butene; 2-methyl-2-butene; pinene; limonene; myrcene; 2-methyl-1-pentene; 2-methyl-2-pentene; p-methyl styrene; indene; 3-methylindene; cyclopentadiene; 1-methyl cyclopentadiene; and mixtures thereof.

Aspect 10: The adhesive composition according to according to any of Aspects 6-9, wherein the co-monomer is selected from the group consisting of cis-1,3-pentadiene; trans-1,3 pentadiene; 2-methyl-1-butene; 2-methyl-2-butene; styrene; alpha-methylstyrene; and mixtures thereof.

Aspect 11: A farnesene polymer comprising one or more polymerized monomers, wherein the one or more polymerized monomers comprises farnesene, and wherein the farnesene polymer has the following properties:

i) less than 10 weight percent of volatile organic compounds (VOC), as measured by thermogravimetric analysis (TGA) as percent weight loss during 1 hour at 110° C.;

ii) a number average molecular weight (Mn) between 300 Da and 1000 Da;

iii) a weight average molecular weight (Mw) between 400 Da and 3000 Da;

iv) a Mw/Mn of not more than 3.00;

v) a glass transition temperature (Tg) between −50° C. and 20° C.; and vi) a viscosity between 400,000 cP and 1,000,000 cP at 25° C.

Aspect 12: The farnesene polymer according to Aspect 11, wherein the farnesene is or comprises β-farnesene.

Aspect 13: The farnesene polymer according to either of Aspect 11 or Aspect 12, wherein the glass transition temperature of the farnesene polymer is between −50° C. and 0° C.

Aspect 14: The farnesene polymer according to any of Aspects 11-13, wherein the Mw of the farnesene polymer is between 400 Da and 800 Da, and the Mn is between 300 Da and 500 Da.

Aspect 15: The farnesene polymer according to any of Aspects 11-14, wherein the farnesene polymer further comprises, as polymerized monomers, between 0 weight percent and 90 weight percent of at least one co-monomer.

Aspect 16: The farnesene polymer according to Aspect 15, wherein the at least one co-monomer is selected from the group consisting of aromatic olefins, non-aromatic olefins, aromatic diolefins, non-aromatic diolefins, and mixtures thereof.

Aspect 17: The farnesene polymer according to either of Aspects 15 or Aspect 16, wherein the at least one co-monomer is selected from the group consisting of styrene; alpha-methyl styrene; cis-1,3-pentadiene; trans-1,3 pentadiene; 2-methyl-1-butene; 2-methyl-2-butene; pinene; limonene; myrcene; 2-methyl-1-pentene; 2-methyl-2-pentene; p-methyl styrene; indene; 3-methylindene; cyclopentadiene; 1-methyl cyclopentadiene; and mixtures thereof.

Aspect 18: The farnesene polymer according to any of Aspects 15-17, wherein the at least one co-monomer is selected from the group consisting of cis-1,3-pentadiene; trans-1,3 pentadiene; 2-methyl-1-butene; 2-methyl-2-butene; styrene; alpha-methylstyrene; and mixtures thereof.

Aspect 19: A method of preparing the farnesene polymer according to any of Aspects 11-18, the method comprising the steps of:

a) combining a farnesene monomer, an organic solvent, between 300 ppm weight and 3000 ppm weight of a proton source, and an optional at least one co-monomer, to form a monomer feed;

b) combining the monomer feed with a Friedel-Crafts polymerization initiator in a vessel to form a polymerization mixture; and c) allowing the polymerization mixture to polymerize the farnesene monomer and the optional at least one co-monomer to form the farnesene polymer.

Aspect 20: The method according to Aspect 19, wherein the farnesene monomer is or comprises β-farnesene.

Aspect 21: The method according to either of Aspect 19 or Aspect 20, wherein the monomer feed comprises between 0 weight percent and 90 weight percent of the at least one co-monomer based on the total amount of farnesene monomer and the at least one co-monomer.

Aspect 22: The method according to any of Aspects 19-21, wherein the monomer feed comprises between 0 weight percent and 40 weight percent of the at least one co-monomer based on the total amount of farnesene monomer and the at least one co-monomer.

Aspect 23: The method according to any of Aspects 19-22, wherein the at least one co-monomer is selected from the group consisting of styrene; alpha-methylstyrene; cis-1,3-pentadiene; trans-1,3 pentadiene; 2-methyl-1-butene; 2-methyl-2-butene; pinene; limonene; myrcene; 2-methyl-1-pentene; 2-methyl-2-pentene; p-methyl-styrene; indene; 3-methylindene; cyclopentadiene; 1-methylcyclopentadiene; and mixtures thereof.

Aspect 24: The method according to any of Aspects 19-23, wherein the at least one Friedel-Crafts polymerization initiator comprises boron trifluoride.

Aspect 25: A method of preparing the adhesive composition according to any of Aspects 1-10, the method comprising the steps of:

a) combining a farnesene monomer, an organic solvent, between 300 ppm weight and 3000 ppm weight of a proton source, and an optional at least one co-monomer, to form a monomer feed;

b) combining the monomer feed with a Friedel-Crafts polymerization initiator in a vessel to form a polymerization mixture;

c) allowing the polymerization mixture to polymerize the farnesene monomer and the optional at least one co-monomer to form the farnesene polymer; and d) combining the farnesene polymer with the elastomer and optionally, one or more further additives to form the adhesive composition, wherein the farnesene polymer is used in an amount effective to impart tackiness to the adhesive composition.

Aspect 26: The method according to Aspect 25, wherein the farnesene monomer is or comprises β-farnesene.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

The advantageous properties of this invention can be observed by reference to the following examples, which illustrate but do not limit the invention.

Methods:

Room temperature viscosity was measured using a Brookfield DV-I+ digital viscometer with the small sample adapter. The sample was first placed in the cup of the viscometer and then the cup was positioned in the adapter sleeve by pushing it up from the bottom. Then the spindle 21 is correctly positioned in the sample. Next, the temperature bath was set to the desired temperature, i.e. 25° C. or 55° C.±0.1° C. The viscometer was run for a minimum of 30 minutes at a speed between 0.1 to 10 RPM such that the reading is between 20% and 80% of the viscometer range. After 30 minutes, the temperature readout was checked to determine that the temperature is correct and within ±0.1° C. in order for the viscosity reading to be valid. If the temperature is correct, the viscosity was recorded. If temperature was not correct, it was rechecked after 15 minutes.

Glass transition temperature (Tg) was measured using Dynamic Mechanical Analysis as the temperature producing a peak in tan δ.

Molecular weights (Mn, Mw, Mz and Mp) were measured using gel permeation chromatography (GPC, also called size exclusion chromatography or SEC) using the equipment and procedures as set out below and polystyrene standards.

GPC Equipment: Agilent 1260 Series Degasser (Part Number G1322A), Isocratic Pump (Part Number G1310B), Autosampler (Part Number G1329B), Thermostatted Column Compartment (Part Number G1316A), Multiple Wavelength Detector (Part Number G1365C), and Refractive Index Detector (Part Number G1362A).

GPC Columns: 1× Agilent ResiPore 50×4.6 mm Guard Column (Part Number PL1513-1300) and 2× Agilent ResiPore 250×4.6 mm 3 um Particle Size Columns (Part Number PL1513-5300)

GPC Software: Cirrus 3.3, ChemStation B04.03[52]
GPC Solvent: THF Stabilized with 250 ppm BHT
GPC Flow Rate: 0.45 ml/min.
GPC Column Compartment Temperature: 40° C.
GPC Injection Volume: 5 μl GPC Sample Preparation: Approximately 0.06 grams of sample was weighed into a vial, dissolved into 10 ml THF and then filtered through a 0.45 micron PTFE membrane. All samples were run the same day as prepared.

GPC Calibration: Agilent EasiCal PS-2 Polystyrene Standards (Part Number PL2010-0605) and American Polymer Standards Corporation Polybutadiene Standards.

The volatile organic content (VOC) was measured using a thermogravimetric analysis (TGA) instrument. The VOC content is reported as percent weight loss during 1 hour at 110° C.

Adhesion testing conformed to standards set out by the Pressure Sensitive Tape Council (PSTC).

Example 1: Preparation of a Farnesene-Based Tackifying Resin

The feed was prepared by blending 368 grams of β-farnesene with 389 grams of recycled solvent comprising non-reactive and un-reacted components, 33.65 grams of a 60% piperylene (co-monomer) concentrate, 9.30 grams iso-amylenes (co-monomer) and 2.40 grams of isopropanol as the co-initiator. Next, 25 grams of heptane as added solvent was added to a temperature-controlled round bottom flask (reactor) equipped with a stirrer. The reactor was heated to 35° C. $BF_3$ gas was then introduced for 10 minutes prior to adding the feed addition in order to have an excess of $BF_3$ in the reactor. The monomer feed was then introduced to the reactor at a rate of 2 ml per minute and the reactor was run in continuous operation, corresponding to a residence time of approximately 2.5 hours. The reaction effluent was quenched in aqueous 25% 2-propanol. After agitating the reaction mixture, the layers were allowed to separate. The organic phase was isolated and washed once more in an equivalent amount of aqueous 25% 2-propanol followed by one wash with distilled water. Next, the washed organic phase was placed into a 3-neck round bottom flask equipped for distillation and 0.06 grams (0.1% of the expected resin weight) of BNX® 1010 (antioxidant from Mayzo, Inc. Suwanee, Ga. USA) was added. This mixture was purged with nitrogen while being heated to 180° C., during which time volatile organics were collected. Once the temperature had reached 180° C., the nitrogen was replaced by steam. Distillable oligomeric by-product and steam condensate were collected until approximately one gram of steam distillate per gram of the farnesene-based tackifying resin product was obtained.

Table 1 shows the polymerization feed for Example 1. Note that the piperylene and isoamylene co-monomer content has been corrected for the amount of piperylene and isoamylene in the stream that was used as part of the solvent.

TABLE 1

| Example 1 polymerization feed | |
| --- | --- |
| Component | wt. % on total feed |
| β-Farnesene | 46.00 |
| Piperylenes | 3.50 |
| Isoamylene | 3.50 |
| Unreactive solvent | 46.41 |
| $BF_3$ gas | 0.28 |
| Isopropanol | 0.31 |

The characteristics of this sample are provided in Table 2. Glass transition temperature was measured using differential scanning calorimetry (DSC). Molecular weights were all measured using size exclusion chromatography, (SEC) also referred to as gel permeation chromatography (GPC) using polystyrene calibration standards. The flash point was measured and Gardner color was measured.

TABLE 2

Example 1 Tackifying Resin Properties

| | |
|---|---|
| Tg (° C.) | −21.7 |
| Mp (peak molecular weight) | 308 |
| Mn (number average molecular weight) | 405 |
| Mw (weight average molecular weight) | 534 |
| Mz (Z-average molecular weight) | 805 |
| PD (polydispersity, Mw/Mn) | 1.319 |
| Gardner Color | 1.0 |
| Flash Point (° C.) | 171.1 |
| TGA, @110° C. during 1 hr (% loss by weight) | 5.774 |
| Viscosity @55° C. (cP) | 2250 |

The Tg of this sample, while desirably low in terms of efficacy for use as a tackifier, was nonetheless high for a farnesene-based resin made using a Friedel-Crafts initiator. Despite their low molecular weights, farnesene-based resins have higher Tgs, higher than those of plasticizing oils of comparable molecular weights whose Tgs typically fall below −50° C. Without being bound by theory, the higher Tgs of the farnesene-based resins are likely due to a degree of cyclization that results from intramolecular attack of the growing polymer chain on double bonds in the polymer backbone.

Advantageously, the VOC content of the farnesene-based resins were found to be lower than that of similar resins made from C5 monomers such as piperylenes and isoamylenes, e.g. Wingtack® 10 (Total Petrochemicals and Refining, Inc. of Houston, Tex.). Again without being bound by theory, it is believed that the low VOC content of the farnesene-based resins is due to the high molecular weight of the primary monomer. With a molecular weight of 204, polymeric molecules containing a farnesene do not produce significant amounts of lower molecular weight hence, more volatile, components. It is believed that much of the VOC components are present in the farnesene-based resins are the result of oligomerization of C5 monomer that are either intentionally added or are a component of the recycle solvent.

Without wishing to be bound by theory, the inventors hypothesize that this glass transition temperature and the likewise surprisingly low VOC content was not due to the formation of Diels-Alder dimers. To determine if such Diels-Alder dimers could be formed, size exclusion chromatography was done on the Example 1 farnesene polymer resin, a sample of Diels-Alder farnesene dimer, farnesene itself, and a conventional tackifying resin made with C5 monomers (Wingtack® 10 manufactured by Total Petrochemicals and Refining, Inc. of Houston, Tex.). The chromatograms are shown in FIG. 1.

As can be seen in the chromatogram of FIG. 1, the molecular weight distribution of the farnesene-based tackifying resin of Example 1 is between those of the farnesene monomer and the farnesene Diels-Alder dimer.

Figure 2:
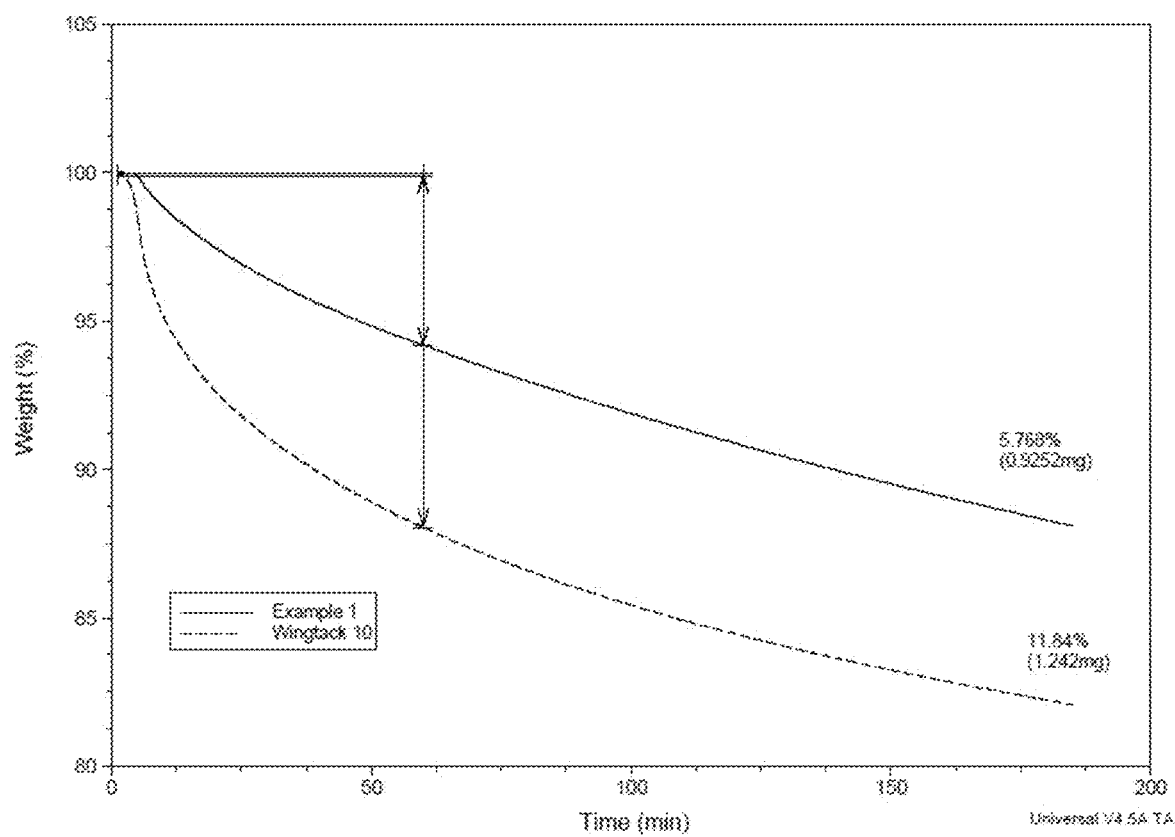
FIG. 2 shows thermogravimetric analysis (TGA) curves at 110° C., comparison between Example 1 tackifying resin and Wingtack® 10 C5-based tackifying resin.
Figure 3:
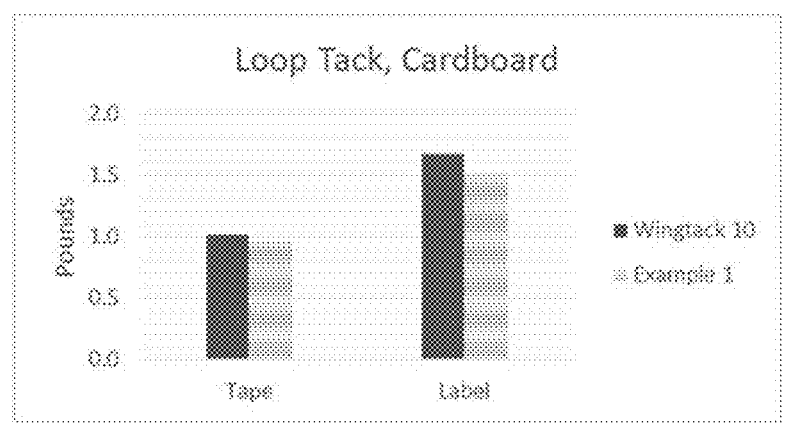
FIG. 3 shows a chart comparing Loop Tack testing on cardboard of an adhesive composition according to an embodiment of the present invention and a comparative adhesive composition containing a similar C5 tackifying resin.
Figure 4:
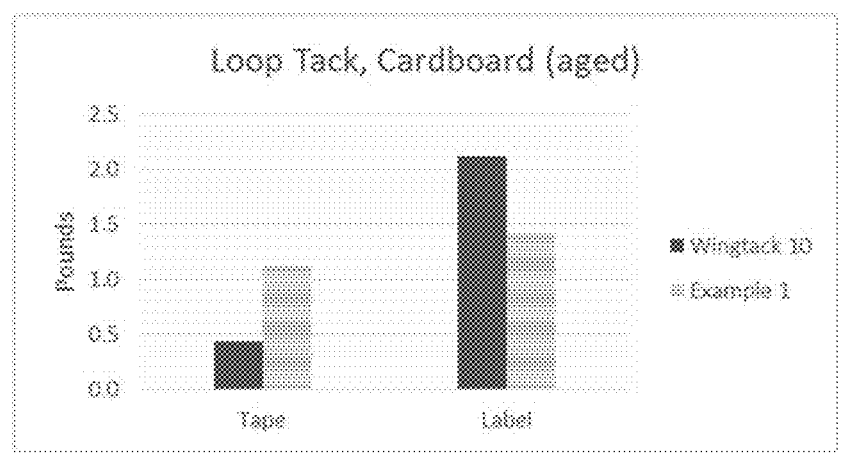
FIG. 4 shows a chart comparing Loop Tack testing on cardboard of an aged adhesive composition according to an embodiment of the present invention and a comparative adhesive composition containing a similar C5 tackifying resin.
Figure 5:
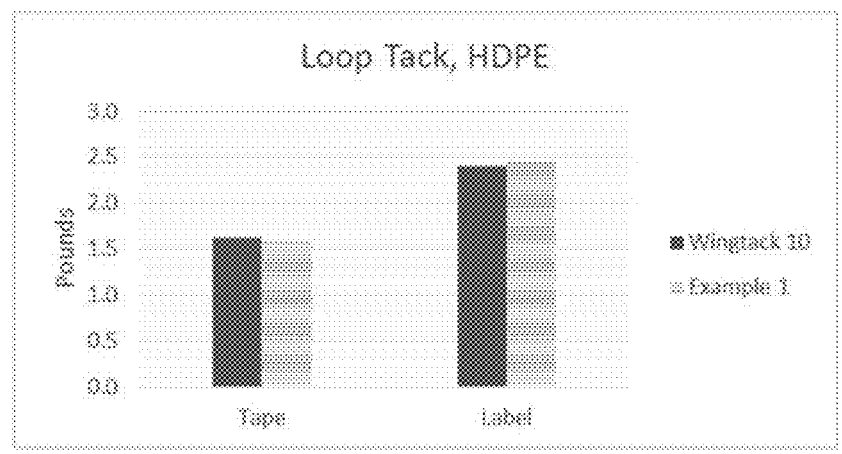
FIG. 5 shows a chart comparing Loop Tack testing on HDPE of an adhesive composition according to an embodiment of the present invention and a comparative adhesive composition containing a similar C5 tackifying resin.
Figure 6:
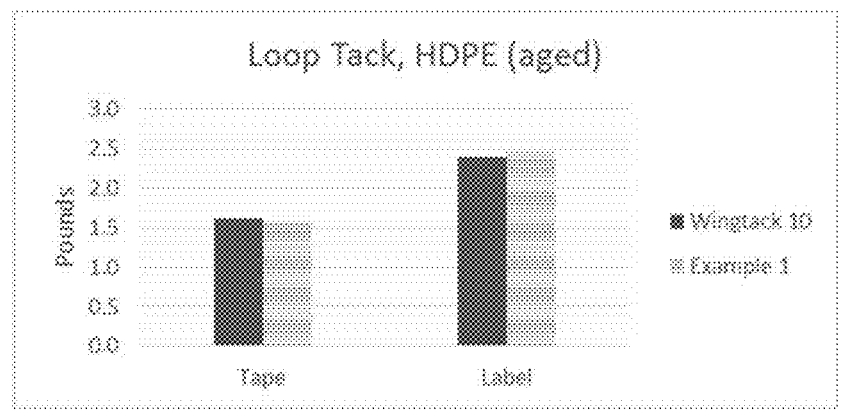
FIG. 6 shows a chart comparing Loop Tack testing on HDPE of an aged adhesive composition according to an embodiment of the present invention and a comparative adhesive composition containing a similar C5 tackifying resin.
Figure 7:
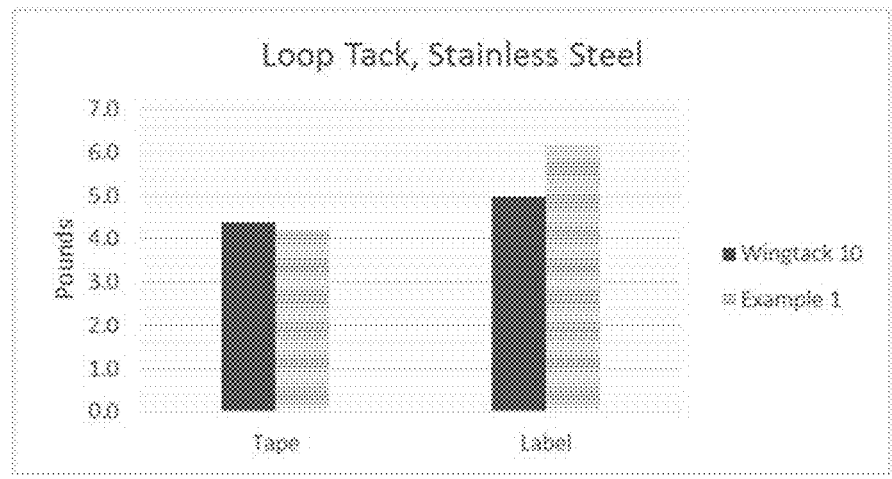
FIG. 7 shows a chart comparing Loop Tack testing on stainless steel of an adhesive composition according to an embodiment of the present invention and a comparative adhesive composition containing a similar C5 tackifying resin.
Figure 8:
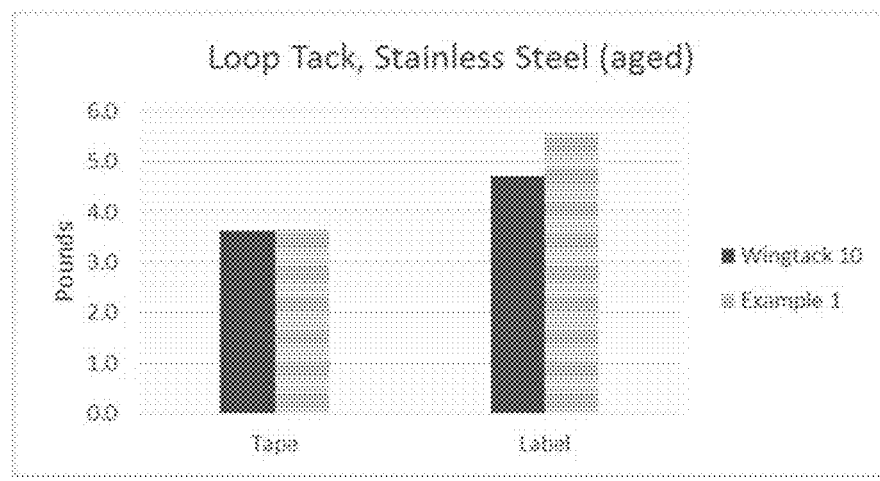
FIG. 8 shows a chart comparing Loop Tack testing on stainless steel of an aged adhesive composition according to an embodiment of the present invention and a comparative adhesive composition containing a similar C5 tackifying resin.
Figure 9:
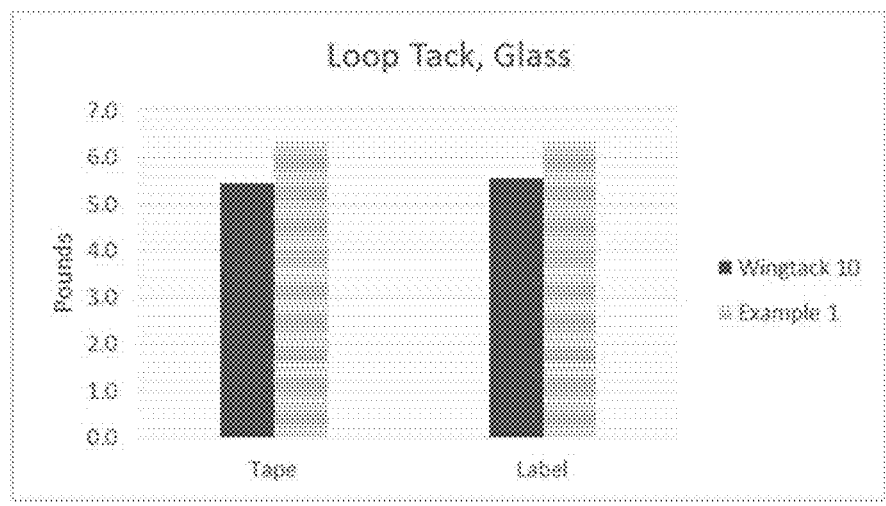
FIG. 9 shows a chart comparing Loop Tack testing on glass of an adhesive composition according to an embodiment of the present invention and a comparative adhesive composition containing a similar C5 tackifying resin.
Figure 10:
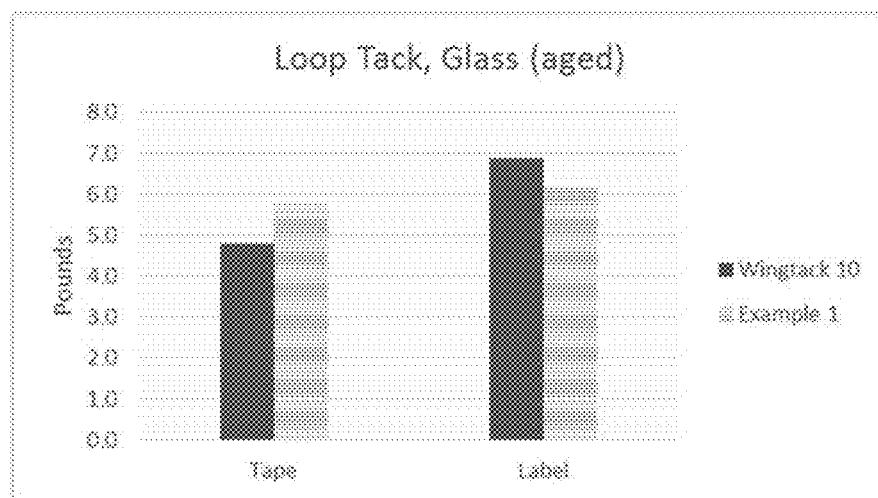
FIG. 10 shows a chart comparing Loop Tack testing on glass of an aged adhesive composition according to an embodiment of the present invention and a comparative adhesive composition containing a similar C5 tackifying resin.
Figure 11:
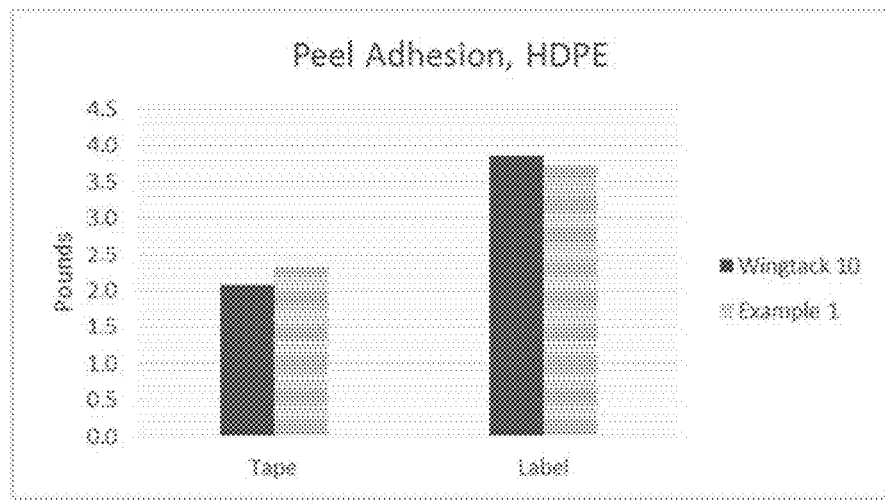
FIG. 11 shows a chart comparing Peel Adhesion testing on HDPE of an adhesive composition according to an embodiment of the present invention and a comparative adhesive composition containing a similar C5 tackifying resin.
Figure 12:
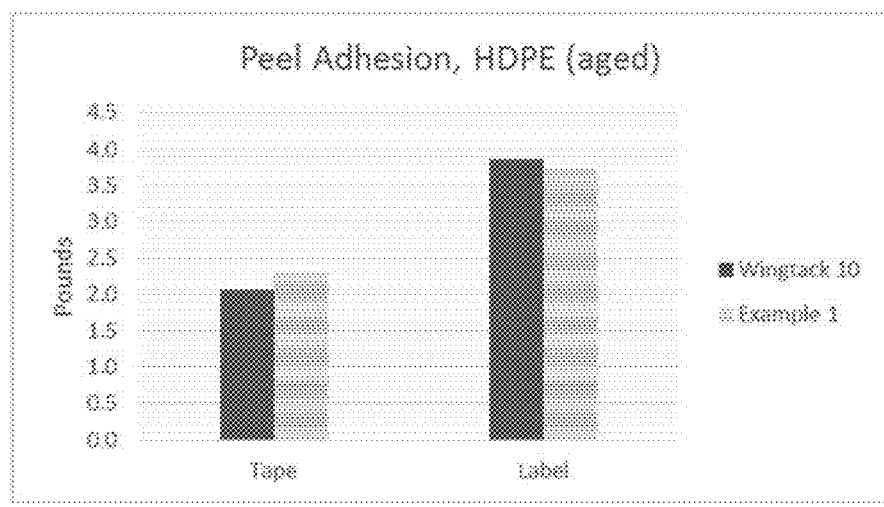
FIG. 12 shows a chart comparing Peel Adhesion testing on HDPE of an aged adhesive composition according to an embodiment of the present invention and a comparative adhesive composition containing a similar C5 tackifying resin.
Figure 13:
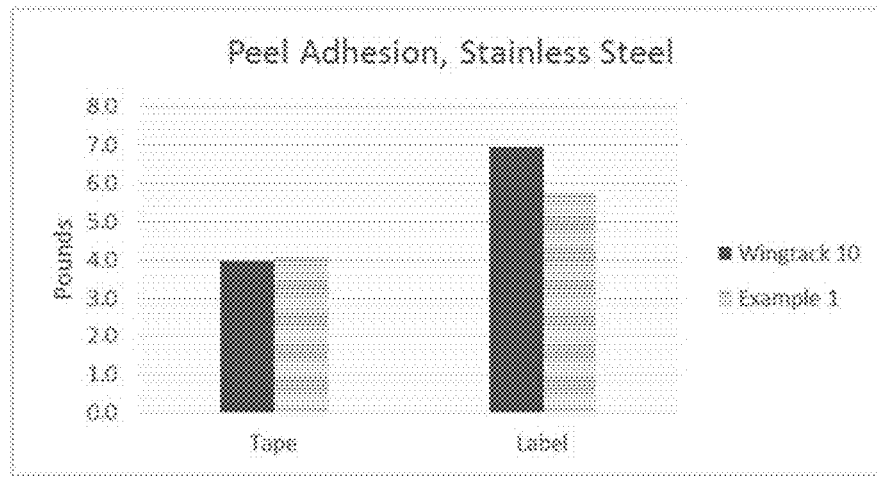
FIG. 13 shows a chart comparing Peel Adhesion testing on stainless steel of an adhesive composition according to an embodiment of the present invention and a comparative adhesive composition containing a similar C5 tackifying resin.
Figure 14:
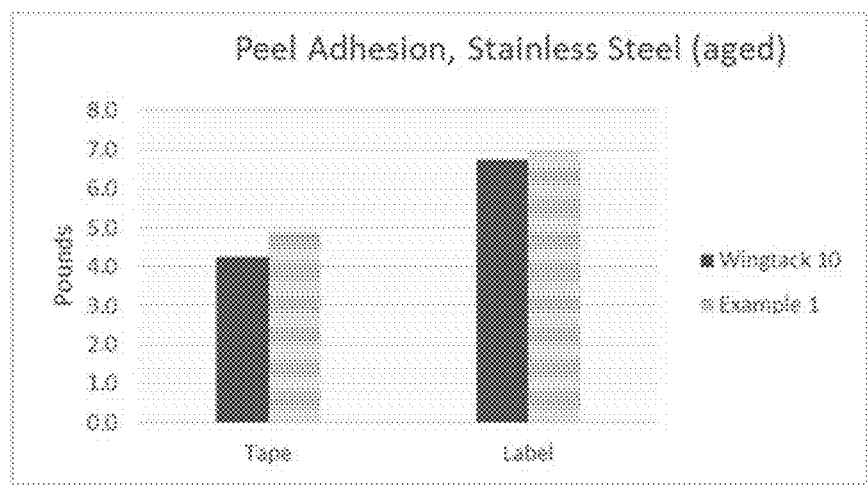
FIG. 14 shows a chart comparing Peel Adhesion testing on stainless steel of an aged adhesive composition according to an embodiment of the present invention and a comparative adhesive composition containing a similar C5 tackifying resin.
Figure 15:
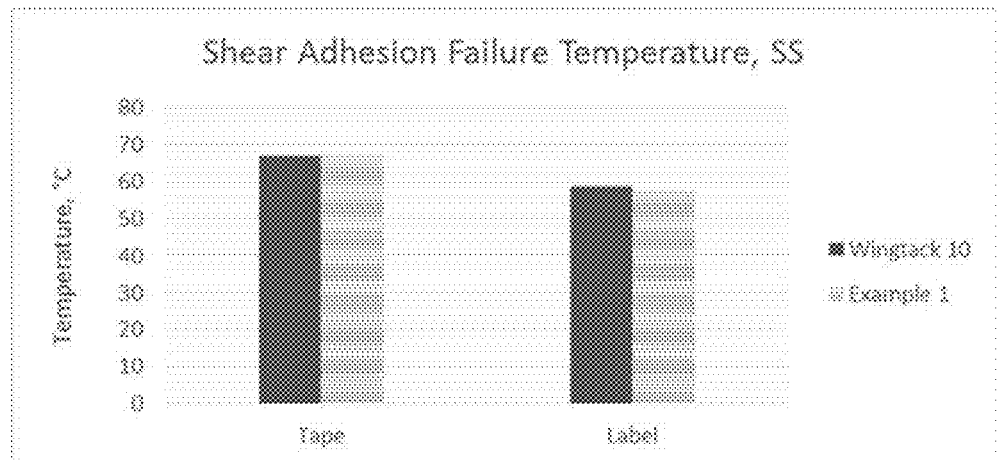
FIG. 15 shows a chart comparing the Shear Adhesion Failure Temperature on stainless steel of an adhesive composition according to an embodiment of the present invention and a comparative adhesive composition containing a similar C5 tackifying resin.
Figure 16:
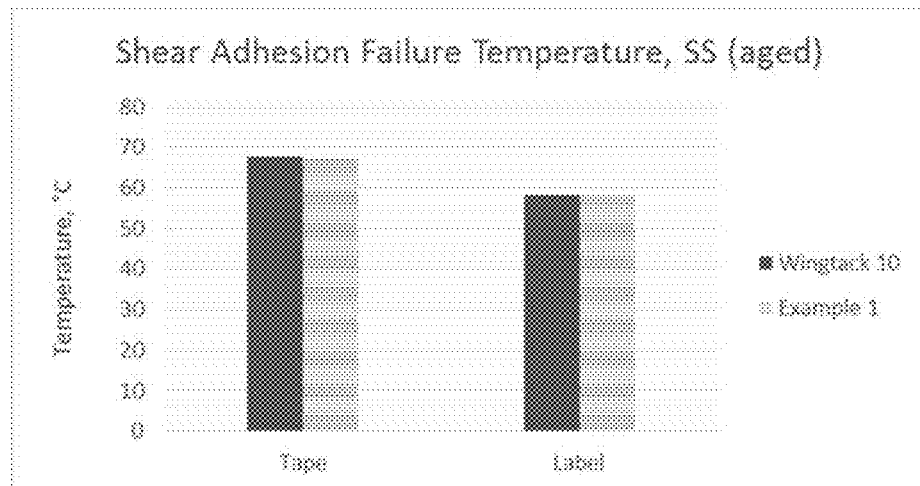
FIG. 16 shows a chart comparing the Shear Adhesion Failure Temperature on stainless steel of an aged adhesive composition according to an embodiment of the present invention and a comparative adhesive composition containing a similar C5 tackifying resin.
Figure 17:
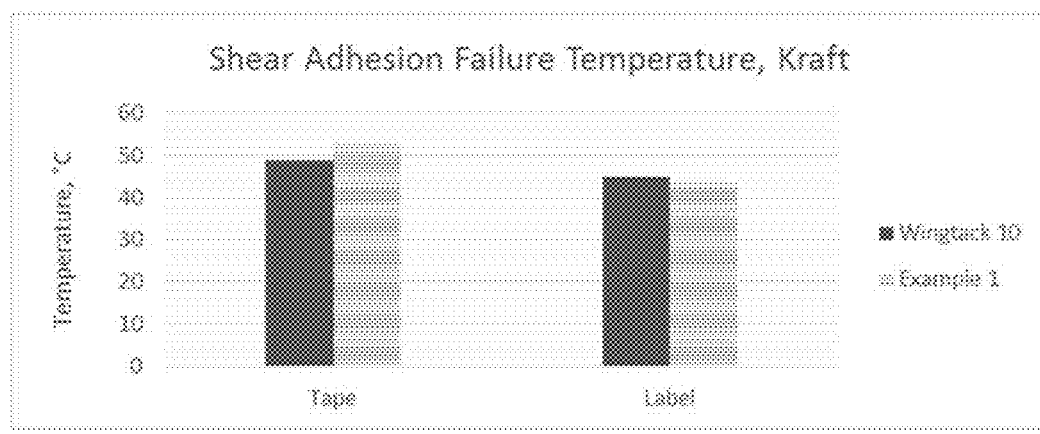
FIG. 17 shows a chart comparing the Shear Adhesion Failure Temperature on Kraft paper of an adhesive composition according to an embodiment of the present invention and a comparative adhesive composition containing a similar C5 tackifying resin.
Figure 18:
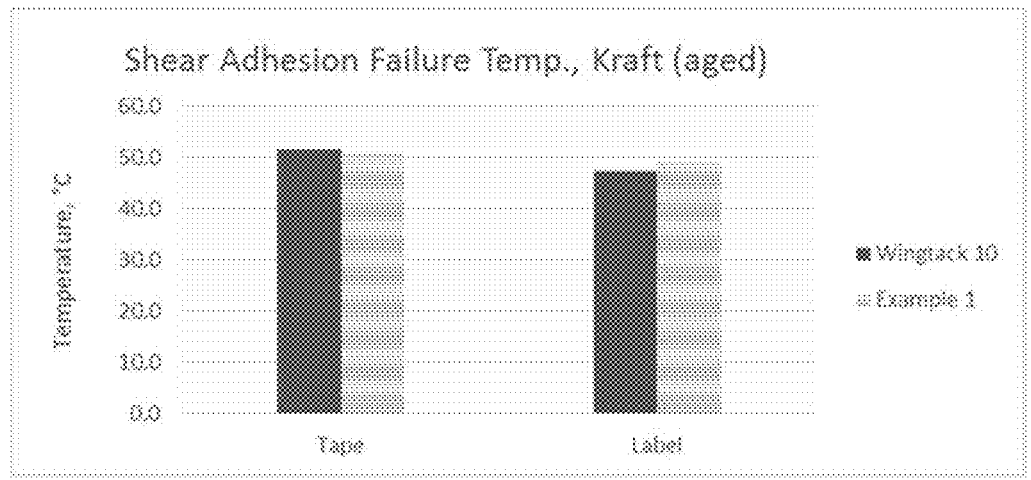
FIG. 18 shows a chart comparing the Shear Adhesion Failure Temperature on Kraft paper of an aged adhesive composition according to an embodiment of the present invention and a comparative adhesive composition containing a similar C5 tackifying resin.

Thermogravimetric analysis (TGA) was also done on the resin of Example 1 and Wingtack® 10. The TGA was done at 110° C. and the weight percent lost was recorded during 1 hour at that temperature. The results are shown in FIG. 2.

Examples 2-5 Preparation of Additional Farnesene-Based Tackifying Resins

Table 3 shows the conditions and monomers for the farnesene-based tackifying resin polymers for Examples 2-5. These resins were made according to the general method described for Example 1, except that for the semi-batch method of Examples 2, 4, and 5, the polymerization was allowed to continue for 45 minutes at the monomer feed rate as cited in Table 3.

TABLE 3

Examples 2-5 Compositions and Reaction Conditions for Farnesene-Based Tackifying Resins

| Feed and Conditions | Example 2 | Example 3 | Example 4 | Example 5 |
|---|---|---|---|---|
| β-Farnesene Monomer | 50 wt. % | 46 wt. % | 35 wt. % | 38 wt. % |
| Co-monomer 1: Piperylenes | — | 4.2 wt. % | 10 wt. % | — |
| Co-monomer 2: Isoamylene | — | 1.2 wt. % | 5 wt. % | 12 wt. % |
| Solvent | 50 wt. % | 48.6 wt. % | 50 wt. % | 50 wt. % |
| Total | 100% | 100% | 100% | 100% |
| Initiator (on total monomers) | 3 wt. % | 0.28 wt. % | 1.6 wt. % | 0.41 wt. % |
| Temperature | 35° C. | 35° C. | 30° C. | 35° C. |
| Stirring Rate | 350 rpm | 350 rpm | 350 rpm | 250 rpm |
| Feed Rate | 2.0 mL/min | 2.0 mL/min | 2.0 mL/min | 2.2 mL/min |
| Reaction Time/Type | 45 min Semi-Batch | Continuous | 45 min Semi-Batch | 45 min Semi-Batch |
| Solvent Type | Recycled Solvent Stream* | Recycled Solvent Stream* | Heptanes (mixture of isomers) | n-Heptane |
| Initiator Type | BF₃ Etherate | BF₃ gas | BF₃ Etherate | BF₃ gas |

*Recycled Solvent Stream comprises unreactive saturated components, partially active and reactive mono-olefins and diolefins, e.g. 2-methyl butane, Cyclopentane, Cyclopentene, tert-2-Pentene, Piperylenes, 2-methyl-2-butene, 2-methyl-1-butene, and others.

The characteristics of Examples 2-5 are provided below in Table 4. Glass transition temperature (Tg) was measured using differential scanning calorimetry (DSC). Molecular weights were all measured using size exclusion chromatography, (SEC) also referred to as gel permeation chromatography (GPC) using polystyrene calibration standards. Flash point was measured. Gardner color was measured.

TABLE 4

Characterization of samples shown in Table 3

|  | Example 2 | Example 3 | Example 4 | Example 5 |
|---|---|---|---|---|
| Tg by DSC | −23° C. | −22° C. | −11° C. | −47° C. |
| Mn | 373 | 405 | 450 | 530 |
| Mw | 444 | 534 | 625 | 1,083 |
| Mz | 549 | 805 | 1071 | 6,728 |
| PD | 1.19 | 1.32 | 1.39 | 2.04 |
| Flashpoint | 165° C. | 171° C. | — | — |
| Brookfield Viscosity @55° C. | — | 2,250 cP | — | — |
| Gardner Color | — | 1.0 G | — | — |
| TGA, 110° C. during 1 hr | — | 5.774 wt. % loss | — | — |

Example 6: Adhesive Applications Testing of Farnesene-Based Tackifying Resin-Containing Adhesives Compared to Commercial C5-Based Tackifying Resin-Containing Adhesives Two types of adhesive formulations were made and evaluated in order to compare the adhesion properties of adhesives made with the farnesene-based tackifying resin described in Example 1 with adhesives made with in two extremely different types of adhesives: adhesive for tapes and adhesive for labels.

In tapes, good adhesion is important, but the tape adhesive must have excellent cohesive strength in order to effectively hold boxes closed under stress. The cohesive strength can be evaluated as shear strength, and therefore the shear strength of the adhesives is an important property for use in tape applications. On the other hand, adhesives intended to be used for labels need only to hold the label to a container and therefore need to provide superior adhesion but do not need to possess as high a shear strength as is required for adhesives intended to be used for tapes.

For avoidance of doubt, it should be understood that the following graphs are NOT meant to illustrate that either the comparative adhesives made with the liquid C5-based tackifying resin, Wingtack® 10 or the adhesives made with an embodiment of the inventive liquid farnesene-based tackifying resin have better or worse performance in any application, but are only intended to demonstrate that the liquid farnesene-based tackifying resin gives "essentially the same" adhesive performance as the comparative C5-based commercial standard liquid tackifying resin. In other words, the comparative formulation is a "benchmark" for the adhesion performance of the liquid farnesene-based tackifying resins when used in an adhesive formulation.

The farnesene-based tackifying resin made according to Example 3 was evaluated for adhesion properties in a hot melt pressure sensitive adhesive composition and a hot melt adhesive composition intended for use with packaging tape. The C5-based tackifying resin used as the comparative tackifying resin sample was Wingtack® 10 (manufactured by Total Petrochemicals and Refining, Inc. of Houston, Tex.) which is derived from a monomer stream composed primarily of piperylenes, i.e. it is a C5-based tackifying resin.

The pressure sensitive label adhesive formulations and the tape adhesive formulations were as shown above, and the formulations are reproduced below as well.

| Component | | Tape Formuations | | Label Formulations | |
|---|---|---|---|---|---|
| | | phr* | wt. % | phr* | wt. % |
| Vector ™ 4113A (elastomer) | SIS | 100 | 40 | — | — |
| Kraton ™ D1113 (elastomer) | SIS | — | — | 100 | 36.9 |
| Wingtack® Extra | tackifier | 125 | 50 | 130 | 48.0 |
| Wingtack® 10 OR Example 1 | liquid tackifier | 25 | 10 | 41 | 15.1 |

*phr is parts per hundred parts of the elastomer

The adhesive compositions above were compounded in an open-top sigma blade mixer at 350° F. (177° C.) under a nitrogen blanket. All mixing times were kept to less than 60 minutes to minimize degradation of base polymer used for the hot melt adhesive. First, the base polymer for the hot melt adhesive formulation and enough antioxidant (AO) (e.g. Irganox® 1010 from BASF) were combined to yield approximately 1% by weight of the antioxidant in the final adhesive formulation and masticated at 100 rpm for approximately 5-10 minutes. Approximately one-third to one-half of the tackifying resin blend (Wingtack® Extra and either Wingtack® 10 or the Example 1 polyfarnesene) was slowly added over a few minutes while mixing. The adhesive composition was mixed for another 10-15 minutes. The remainder of the tackifying resin blend was slowly added over a few minutes and then mixed another 10-15 minutes. Finally, the oil was slowly added over several minutes while mixing and then mixed another 10 minutes. The adhesive composition was transferred to a suitable container coated with a release-type coating in order to facilitate easy removal of the adhesive when cool.

To form the samples to be tested, each of the adhesive compositions were coated onto 2 mil (50 micron) PET at an approximate thickness of 0.9 mils (22 microns) dry. The adhesive coated PET was laminated to release paper and allowed to condition at 50% relative humidity and 73° F. (23° C.) (a minimum of 24 hours before testing. One inch (2.54 cm) wide strips were cut and tested according to methods detailed by the Pressure Sensitive Tape Council (PSTC).

PSTC-16 Loop Tack testing was conducted using four test substrates: corrugated cardboard, high density polyethylene (HDPE), stainless steel (SS) and glass. The results were reported as Pounds per Inch Width.

PSTC-107 Room Temperature Shear testing was conducted using test specimens that were 0.5" (1.27 cm) wide with an overlap of 0.5" (1.27 cm) [total 0.25 in$^2$ (1.61 cm$^2$) contact area] and were tested using 500 g weights and stainless steel panels. A second set of samples were tested against unbleached Kraft paper held to the test panels with double-faced tape.

PSTC-101 Peel Adhesion was measured in accordance to the method. The sample of tape was laid on the test panel (SS, HDPE, cardboard or glass), rolled with the appropriate 4.5 pound roller and then peeled from the panel utilizing a CRE (Constant Rate of Extension tensile tester) with the forced per inch width being reported.

Heat Resistance was determined by measuring the Shear Adhesion Failure Temperature (SAFT) which is reported in ° C. Test specimens for the SAFT determination were 1 inch wide and had a contact area of 1 in$^2$ with a weight of 1000 grams. The SAFT was measured on both stainless steel and Kraft paper and was completed following the PSTC-17 test method.

All of the results reported for heat-aged testing were completed on samples that had been aged for one week at 60° C. The aging was completed with the tape samples applied to the release liner and represent an attempt to simulate aging of the tape or label before being used in the application it was designed for (i.e., tape or label).

All adhesion testing was conducted in triplicate and the average results were reported.

Results of Adhesion Testing:

FIGS. 3-10 show the results of loop tack testing on three different substrates for both the tape and label adhesive formulations. The three substrates tested were: corrugated cardboard, high density polyethylene (HDPE) and stainless steel (SS). Both aged and unaged samples were tested for Loop Tack.

Note that the Loop Tack is measured from corrugated cardboard to ensure that the tape and label will adequately stick. As is understood by a person having ordinary skill in the art, this test may result in significant variation between samples. It is understood that the surface of corrugated cardboard is highly irregular and thus can yield variation in the tack value.

Thus, it can be seen in FIGS. 3-10 that the hot melt adhesives for both tape and label applications made with the inventive farnesene-based tackifying resins as a liquid tackifier had similar performance to the hot melt adhesive formulations made using the commercial C5-based liquid tackifying resins. The two different liquid tackifying resins are designated Example 1 and Wingtack® 10, respectively on the chart legends.

The results of the Peel Adhesion testing on glass and stainless steel is shown in FIGS. 11-14. The hot melt adhesives for both tape and label applications made with the inventive farnesene-based tackifying resins had similar performance to the hot melt adhesive formulations made using the commercial C5-based tackifying resins. The two different tackifying resins are designated Example 1 and Wingtack® 10, respectively, on the chart legends.

FIGS. 15-18 show the Shear Adhesion Failure Temperature for unaged and aged samples for tape and label applications on stainless steel and Kraft paper, comparing the farnesene-based tackifying resin Example 1 to the commercial C5-based tackifying resin Wingtack® 10. The hot melt adhesives for both tape and label applications made with the inventive farnesene-based tackifying resins had similar performance to the hot melt adhesive formulations made using the commercial C5-based tackifying resins.

Figure 19:
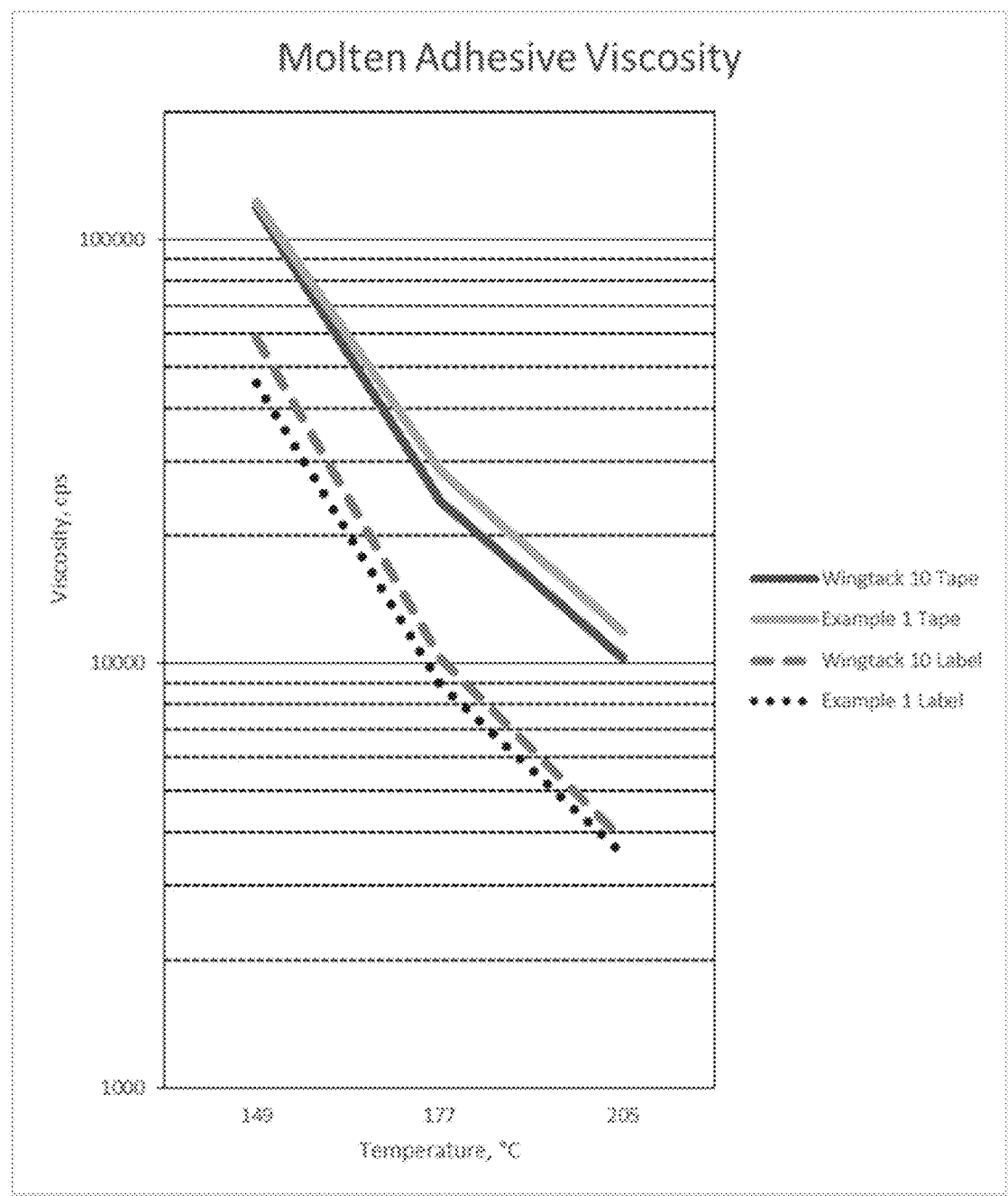
FIG. 19 shows a comparison of the viscosities of two different types of adhesive formulations (tape and label) each made with a tackifying resin according to an embodiment of the present invention and a comparative adhesive composition containing a similar C5 tackifying resin.

FIG. 19 shows the viscosity in cP as a function of temperature for the tape and the label types of hot melt adhesive formulations made with the farnesene-based tackifying resin, i.e. Example 1 and the C5-based tackifying resin (Wingtack® 10). Note that the viscosities are similar for the two types of tackifying resins, indicating that they will likely perform similarly in hot-melt adhesive-dispensing equipment.

Figure 20:
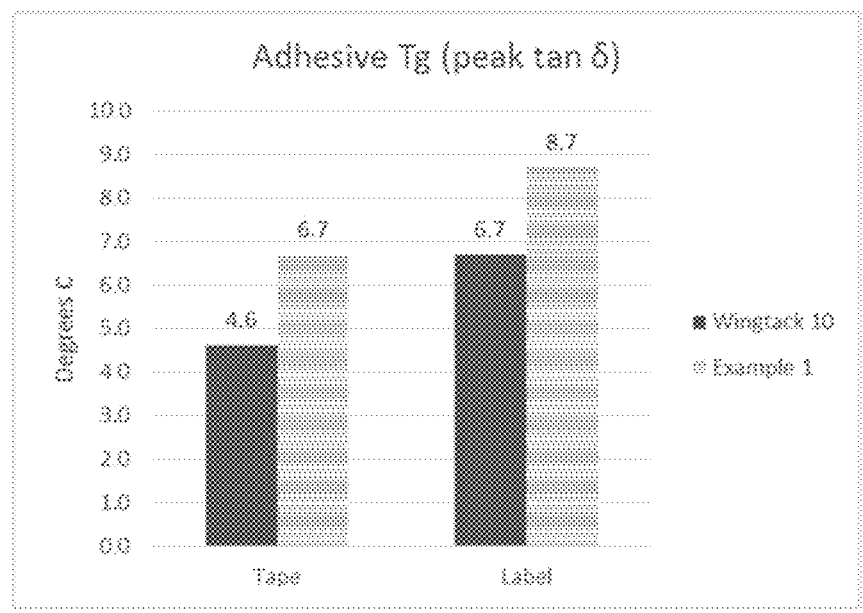
FIG. 20 shows a comparison of the glass transition temperatures (measured as peak tan δ) of two different types of adhesive formulations (tape and label) each made with a tackifying resin according to an embodiment of the present invention and a comparative adhesive composition containing a similar C5 tackifying resin.

FIGS. 20 and 21 show the glass transition temperature (Tg) measured as peak tan δ of the adhesive formations was approximately 2° C. higher for the adhesives made with farnesene-based tackifying resin Example 1 than for the adhesives made with the commercial C5-based tackifying resin (Wingtack® 10).

Thus, the farnesene-based tackifier resins yielded adhesives having similar adhesion performance compared to conventional commercially available C5-based tackifier resins for both tapes and pressure sensitive labels. Importantly, the farnesene-based tackifier resins also have significantly lower VOC content when compared to typical commercially available C5 resins. These farnesene-based tackifier resins also provided adhesives with similar heat resistance, when compared to adhesives containing typical commercially available C5 resins.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the invention. Additionally, in some embodiments, the invention can be construed as excluding any element or process step not specified herein.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

We claim:

1. An adhesive composition comprising an elastomer and a tackifying resin, wherein the tackifying resin comprises a farnesene polymer or copolymer having the following properties:
   i) less than 10 weight percent of volatile organic compounds (VOC), as measured by thermogravimetric analysis (TGA) as percent weight loss during 1 hour at 110° C.;
   ii) a number average molecular weight (Mn) between 300 Da and 500 Da;
   iii) a weight average molecular weight (Mw) between 400 Da and 800 Da;
   iv) Mw/Mn between 1.00 and 3.00;
   v) a glass transition temperature (Tg) between −50° C. and 20° C.; and
   vi) a viscosity between 400,000 cP and 1,000,000 cP at 25° C.

2. The adhesive composition according to claim 1, wherein the farnesene comprises β-farnesene.

3. The adhesive composition according to claim 1, wherein the glass transition temperature of the farnesene polymer or copolymer is between −50° C. and 0° C.

4. The adhesive composition according to claim 1, wherein the elastomer is selected from the group consisting of styrene-isoprene block copolymers, polyacrylate resins, poly ethylene vinyl acetate (EVA) resins, polystyrene butadiene resins, random styrene butadiene (SBR) copolymers, styrene-butadiene block copolymers, styrene-isoprene-butadiene-styrene (SIBS) copolymers, styrene-ethylene-propylene-styrene (SEPS) copolymers, styrene-ethylene-butylenestyrene (SEBS) block copolymers, amorphous poly-olefin (APO) resins, and mixtures thereof.

5. The adhesive composition according to claim 1, wherein the farnesene polymer or copolymer further comprises, as polymerized monomers, no more than 90 weight percent of at least one co-monomer.

6. The adhesive composition according to claim 1, wherein the farnesene polymer or copolymer further comprises, as polymerized monomers, no more than 40 weight percent of at least one co-monomer.

7. The adhesive composition according to claim 5, wherein the at least one co-monomer is selected from the group consisting of aromatic olefins, non-aromatic olefins, aromatic diolefins, non-aromatic diolefins, and mixtures thereof.

8. The adhesive composition according to claim 5, wherein the at least one co-monomer is selected from the group consisting of styrene; alpha-methylstyrene; cis-1,3-pentadiene; trans-1,3pentadiene; 2-methyl-1-butene; 2-methyl-2-butene; pinene; limonene; myrcene; 2-methyl-1-pentene; 2-methyl-2-pentene; p-methyl styrene; indene; 3-methylindene; cyclopentadiene; 1-methylcyclopentadiene; and mixtures thereof.

9. The adhesive composition according to claim 5, wherein the at least one co-monomer is selected from the group consisting of cis-1,3-pentadiene; trans-1,3-pentadiene; 2-methyl-1-butene; 2-methyl-2-butene; styrene; alpha-methyl styrene; and mixtures thereof.

10. A farnesene polymer comprising one or more polymerized monomers, wherein the one or more polymerized monomers comprises farnesene; wherein the farnesene polymer has the following properties:
   i) less than 10 weight percent of volatile organic compounds (VOC), as measured by thermogravimetric analysis (TGA) as percent weight loss during 1 hour at 110° C.;
   ii) a number average molecular weight (Mn) between 300 Da and 500 Da;
   iii) a weight average molecular weight (Mw) between 400 Da and 800 Da;
   iv) a Mw/Mn of not more than 3.00;
   v) a glass transition temperature (Tg) between −50° C. and 20° C.; and
   vi) a viscosity between 400,000 cP and 1,000,000 cP at 25° C.

11. The farnesene polymer according to claim 10, wherein the farnesene comprises β-farnesene.

12. The farnesene polymer according to claim 10, wherein the glass transition temperature of the farnesene polymer is between −50° C. and 0° C.

13. The farnesene polymer according to claim 10, wherein the farnesene polymer further comprises, as polymerized monomers, no more than 90 weight percent, limits included, of at least one co-monomer.

14. The farnesene polymer according to claim 13, wherein the at least one co-monomer is selected from the group consisting of aromatic olefins, non-aromatic olefins, aromatic diolefins, non-aromatic diolefins, and mixtures thereof.

15. The farnesene polymer according to claim 13, wherein the at least one co-monomer is selected from the group consisting of styrene; alpha-methylstyrene; cis-1,3-pentadiene; trans-1,3-pentadiene; 2-methyl-1-butene; 2-methyl-2-butene; pinene; limonene; myrcene; 2-methyl-1-pentene; 2-methyl-2-pentene; p-methyl styrene; indene; 3-methylindene; cyclopentadiene; 1-methyl cyclopentadiene; and mixtures thereof.

16. The farnesene polymer according to claim 13, wherein the at least one co-monomer is selected from the group consisting of cis-1,3-pentadiene; trans-1,3-pentadiene; 2-methyl-1-butene; 2-methyl-2-butene; styrene; alpha-methylstyrene; and mixtures thereof.

17. A method of preparing the farnesene polymer according to claim 10, the method comprising the steps of:
   a) combining a farnesene monomer, an organic solvent, between 300 ppm weight and 3000 ppm by weight of a proton source, and an optional at least one co-monomer, to form a monomer feed;
   b) combining the monomer feed with a Friedel-Crafts polymerization initiator in a vessel to form a polymerization mixture; and
   c) allowing the polymerization mixture to polymerize the farnesene monomer and the optional at least one co-monomer to form the farnesene polymer.

18. The method according to claim 17, wherein the farnesene monomer comprises β-farnesene.

19. The method according to claim 17, wherein the monomer feed comprises between 0 weight percent and 90 weight percent, limits included, of the at least one co-monomer based on the total amount of farnesene monomer and the at least one co-monomer.

20. The method according to claim 17, wherein the monomer feed comprises between 0 weight percent and 40 weight percent, limits included, of the at least one co-monomer based on the total amount of farnesene monomer and the at least one co-monomer.

21. The method according to claim 19, wherein the at least one co-monomer is selected from the group consisting of styrene; alpha-methylstyrene; cis-1,3-pentadiene; trans-1,3-pentadiene; 2-methyl-1-butene; 2-methyl-2-butene; pinene; limonene; myrcene; 2-methyl-1-pentene; 2-methyl-2-pentene; p-methyl styrene; indene; 3-methylindene; cyclopentadiene; 1-methyl cyclopentadiene; and mixtures thereof.

22. The method according to claim 17, wherein the Friedel-Crafts polymerization initiator comprises boron trifluoride.

23. A method of preparing the adhesive composition according to claim 1, the method comprising the steps of:
   a) combining a farnesene monomer, an organic solvent, between 300 ppm weight and 3000 ppm weight of a proton source, and an optional at least one co-monomer, to form a monomer feed;
   b) combining the monomer feed with a Friedel-Crafts polymerization initiator in a vessel to form a polymerization mixture;
   c) allowing the polymerization mixture to polymerize the farnesene monomer and the optional at least one co-monomer to form the farnesene polymer; and
   d) combining the farnesene polymer with the elastomer and optionally, one or more further additives to form the adhesive composition, wherein the farnesene polymer is used in an amount effective to impart tackiness to the adhesive composition.

24. The method according to claim 23, wherein the farnesene monomer comprises β-farnesene.

* * * * *